US009041649B2

(12) United States Patent
Yamauchi et al.

(10) Patent No.: US 9,041,649 B2
(45) Date of Patent: May 26, 2015

(54) COORDINATE DETERMINATION APPARATUS, COORDINATE DETERMINATION METHOD, AND COORDINATE DETERMINATION PROGRAM

(75) Inventors: Masaki Yamauchi, Osaka (JP); Yoshihiro Kojima, Hyogo (JP); Tomonari Takahashi, Osaka (JP); Kumi Harada, Osaka (JP); Yoichi Ikeda, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 795 days.

(21) Appl. No.: 13/383,966

(22) PCT Filed: May 17, 2011

(86) PCT No.: PCT/JP2011/002729
§ 371 (c)(1),
(2), (4) Date: Jan. 13, 2012

(87) PCT Pub. No.: WO2011/145330
PCT Pub. Date: Nov. 24, 2011

(65) Prior Publication Data
US 2012/0113001 A1 May 10, 2012

(30) Foreign Application Priority Data

May 18, 2010 (JP) .................. 2010-114752

(51) Int. Cl.
*G06F 3/038* (2013.01)
*G06F 3/0489* (2013.01)
(Continued)

(52) U.S. Cl.
CPC .............. *G06F 3/038* (2013.01); *G06F 3/0416* (2013.01); *G06F 3/04883* (2013.01); *G06F 3/04892* (2013.01)

(58) Field of Classification Search
CPC .............. G06F 3/04883; G06F 3/0416; G06F 3/04892; G06F 3/038
See application file for complete search history.

(56) References Cited

U.S. PATENT DOCUMENTS 7,075,524 B2    7/2006  Kobayashi et al.
7,486,281 B2    2/2009  Kobayashi et al.
(Continued)

FOREIGN PATENT DOCUMENTS

CN          1475897 A      2/2004
CN        101078963 A     11/2007
(Continued)

OTHER PUBLICATIONS

International Search Report issued Jun. 14, 2011 in corresponding International Application No. PCT/JP2011/002729.
(Continued)

*Primary Examiner* — Gerald Johnson
(74) *Attorney, Agent, or Firm* — Wenderoth, Lind & Ponack, L.L.P.

(57) ABSTRACT

To switch a coordinate mode by automatically recognizing a coordinate mode more usable for a user performing a natural operation, a coordinate determination apparatus (200) according to the present invention includes: an obtain and store unit (204) which obtains coordinate information from a coordinate input device (201) and stores the coordinate information onto a recording medium; a time correlation specifying unit (320) which specifies a correlation between times of input indicated by first and second coordinate information; a coordinate correlation specifying unit (324) which specifies input coordinates indicated by the second and third coordinate information; a coordinate mode selection unit (326) which selects the coordinate mode based on a coordinate correlation value and a time correlation value; and a coordinate transform unit (328) which transforms the input coordinates indicated by the second coordinate information into coordinates selected according to the coordinate mode.

18 Claims, 19 Drawing Sheets

(51) Int. Cl.
*G06F 3/041* (2006.01)
*G06F 3/0488* (2013.01)

(56) References Cited

U.S. PATENT DOCUMENTS

| | | |
|---|---|---|
| 2001/0017617 A1 | 8/2001 | Uchiyama |
| 2003/0095112 A1* | 5/2003 | Kawano et al. ............... 345/173 |
| 2004/0021645 A1 | 2/2004 | Kobayashi et al. |
| 2006/0202973 A1 | 9/2006 | Kobayashi et al. |
| 2007/0132724 A1 | 6/2007 | Muranaka |
| 2008/0055242 A1* | 3/2008 | Hwang ......................... 345/157 |
| 2008/0142280 A1* | 6/2008 | Yamamoto et al. ........ 178/18.02 |
| 2009/0278808 A1 | 11/2009 | Akiyama |

FOREIGN PATENT DOCUMENTS

| | | |
|---|---|---|
| JP | 10-333817 | 12/1998 |
| JP | 10-340153 | 12/1998 |
| JP | 11-95912 | 4/1999 |
| JP | 2001-117713 | 4/2001 |
| JP | 2001-228964 | 8/2001 |
| JP | 2006-201916 | 8/2006 |
| JP | 2009-276819 | 11/2009 |

OTHER PUBLICATIONS

Kotaro Hanai et al., "Cursor movement method for touchpad using contact area", The 70$^{th}$ National Convention of Information Processing Society of Japan, 2008, pp. 1-2 (with partial English translation).
Office Action with Search Report issued Jan. 28, 2015 in corresponding Chinese Patent Application No. 201180002866.0 (with English translation of Search Report).

* cited by examiner

Absolute coordinate mode

Relative coordinate mode

COORDINATE DETERMINATION APPARATUS, COORDINATE DETERMINATION METHOD, AND COORDINATE DETERMINATION PROGRAM

TECHNICAL FIELD

The present invention relates to coordinate determination apparatuses, coordinate determination methods, and coordinate determination programs, and particularly relates to a coordinate determination apparatus that determines a coordinate position of a pointer on a display unit included in a display apparatus, based on input information obtained from a coordinate input device.

BACKGROUND ART

With development of larger-screen displays with higher-performance, not only are televisions used for viewing broadcast programs and movies, but also new functions are being realized and used such as: browsing a variety of information through Internet access; operating in cooperation with a household device connected to a network; and various applications such as photo viewers and games.

In such a context, in order to deal with such various applications and functions expected to be further developed in future, it is essential to develop an input device which enables an input operation with higher degrees of freedom and flexibility, in addition to a conventional representative input device including a plurality of buttons.

A pointing device is an input device which allows controlling a pointer or a cursor displayed on the screen and specifying an arbitrary position or direction of the pointer or cursor, and is, for example, a touch panel, a track ball, a joystick, and a mouse. Compared to those of a conventional button type, this pointing device facilitates an operation for selecting menus and objects regardless of the graphical user interface (GUI) configuration, and is thus being incorporated into a cellular phone, an audio-visual (AV) device, and a game device that have recently been developed.

Many of such apparatuses have recently been developed as an apparatus for which a touch panel or a touchpad is adopted as an input device, and are characterized by intuitiveness that allows operations through direct touch with a finger or pen. Such devices, allowing use of many command gesture operations, are also being used as a quick pointing device which realizes higher degrees of freedom as a remote control for household appliances used by a larger number of users, in addition to being used for information devices.

Such a conventional pointer position presentation method and an operation method that are used on the display apparatus according to the conventional input coordinate input device can be largely divided into four groups according to grouping axes: "whether a coordinate input position and a display apparatus are integrated or separate" and "whether the coordinate system on the coordinate input device on which the user provides an input corresponds, on a one-to-one basis, to the coordinate system displayed by the system on the display apparatus".

Here, being integrated indicates having "a shape such that the coordinate input device and the display apparatus are superimposed as one device like a touch panel" and being separate indicates having a "shape such that the coordinate input device and the display apparatus are separately provided like a display and a mouse of a personal computer".

Hereinafter, for the purpose of description, a mode in which the coordinate system input by the user corresponds to the coordinate system displayed by the system on a one-to-one basis is referred to as an absolute coordinate mode, and the other mode is referred to as a relative coordinate mode. In addition, for the purpose of description, mutually switching these coordinate modes is referred to as coordinate mode switching.

(1) Integrated Absolute Coordinate Mode

This is a configuration in which a display unit (display) of the display apparatus and an input detection unit (touch panel) of the coordinate input device are superimposed, and in which pointing is performed by directly touching an operation target (an icon, and so on) on the display unit. Examples include: Nintendo DS (registered trademark) of Nintendo Co., Ltd., and iPhone (registered trademark).

(2) Separate Relative Coordinate Mode

This is a configuration in which the display unit of the display apparatus and the input detection unit of the coordinate input device are not physically superimposed, and coordinates are indirectly input to the display apparatus. Examples include: a mouse for a desktop personal computer, and a touchpad for a laptop personal computer. Although the touchpad and the display apparatus can be considered to be integrated when the entire laptop personal computer is regarded as one device, the touchpad and the display apparatus in the present invention are considered to be separate for the reason that the display unit and the input detection unit are not physically overlapped as in the example (1) above.

(3) Separate Absolute Coordinate Mode

This is a configuration in which a set of coordinates on the input detection unit such as a touchpad or a tablet corresponds to a set of coordinates on the display unit on a one-to-one basis. Examples include: a touchpad for a handwriting input device and an external input tablet for a drawing tool. Examples include: a pen-input tablet and a touch tablet (not of an all-in-one type) of Wacom. Since a coordinate point at which the input detection unit is touched (at which the input is started) is directly transformed into a corresponding coordinate point on the display unit, this mode is used for input of handwriting Chinese characters, illustration drawing, and so on.

(4) Integrated Relative Coordinate Mode

Examples include using a part of an input detection unit of a coordinate input device which also functions as a display unit of a display apparatus, for operating a lead character in a game in part of a game application through the touch panel. The control device and method corresponding to this case are not common compared to those in (1) to (3) above.

Thus, the method of exchanging coordinates (display control) between the coordinate input device and the display apparatus largely includes two modes, "absolute coordinate mode" and "relative coordinate mode".

As a representative example, FIGS. 16 and 17 show an example of pointing using the "separate absolute coordinate mode" and "separate relative coordinate mode". Note that an input detection unit 210 is, for example, a touchpad. In addition, a display unit 230 is, for example, a liquid crystal display (LCD). In this context, for the purpose of describing the coordinate mode, it is assumed that when tracing the input detection unit 210 with a finger, a trajectory of the pointer is displayed on the display unit 230.

FIG. 16 is a diagram showing a correspondence, in the absolute coordinate mode, between a trajectory of the finger on the input detection unit 210 and a trajectory of the pointer on the display unit 230.

For example, when touching the input detection unit 210 with a finger and tracing as shown by a trajectory A610, a trajectory display A620 is displayed on the display unit 230.

In the display, such contact coordinates on the input detection unit 210 correspond to the coordinates on the display unit 230 on a one-to-one basis.

On the other hand, FIG. 17 is a diagram showing a correspondence, in the relative coordinate mode, between a trajectory of the finger on the input detection unit 210 and a trajectory of the pointer on the display unit 230.

For example, when touching the input detection unit 210 with a finger and tracing trajectories B630, C632, and D634 in order, the display unit 230 serially displays trajectory displays B640, C642, and D644. Here, the trajectory displays B640, C642, and D644 correspond respectively to inputs of trajectories B630, C632, and D634.

CITATION LIST

Patent Literature

[PTL 1] Japanese Unexamined Patent Application Publication No. 2001-117713
[PTL 2] Japanese Unexamined Patent Application Publication No.10-340153
[PTL 3] Japanese Unexamined Patent Application Publication No.11-095912
[PTL 4] Japanese Unexamined Patent Application Publication No.2006-201916
[PTL 5] Japanese Unexamined Patent Application Publication No.2001-228964

Non Patent Literature

[NPL 1] Kotaro Hanai and Hiroyasu Kakuda, "Cursor movement method for touchpad using contact area", International Conference on Human-Computer Interaction 2008, Department of Computer Science, The University of Electro-Communications

SUMMARY OF INVENTION

Technical Problem

However, the conventional coordinate input device has a problem of not allowing automatic switching of the coordinate mode during performance of operations natural for the user.

In practice, it is often the case that switching of the coordinate mode is necessary for one coordinate input device. In other words, in one coordinate input device, there are cases where: the input from the user should be interpreted as the absolute coordinate mode; and the input should be interpreted as the relative coordinate mode.

It is up to user preference in which one of the modes, the relative coordinate mode and the absolute coordinate mode, the operation should be performed, but in order to allow the user to comfortably perform the operation, it is necessary to automatically switch the coordinate mode between the relative coordinate mode and the absolute coordinate mode, without extra operation such as operating a physical switch and so on for switching the coordinate mode. However, with the conventional technique, a coordinate input device that automatically switches the coordinate mode is yet to be realized.

The present invention is conceived to solve such a conventional problem, and it is an object of the present invention to provide a coordinate determination apparatus which automatically recognizes the coordinate mode that is more usable for the user during performance of a natural operation.

Solution to Problem

A coordinate determination apparatus according to an aspect of the present invention is a coordinate determination apparatus which determines output coordinates corresponding to input coordinates, and the coordinate determination apparatus includes: an obtain and store unit which serially obtains coordinate information indicating the input coordinates and a time of input of the input coordinates, and stores the coordinate information onto a recording medium; a time correlation specifying unit which specifies, as a time correlation value, a correlation between a time of input indicated by first coordinate information and a time of input indicated by second coordinate information, the first and the second coordinate information being among pieces of coordinate information stored on the recording medium; a coordinate correlation specifying unit which specifies, as a coordinate correlation value, a correlation between a set of input coordinates indicated by the second coordinate information and a set of input coordinates indicated by third coordinate information, the second and the third coordinate information being among the pieces of coordinate information; a coordinate mode selection unit which selects, as a coordinate mode, one of a first coordinate mode and a second coordinate mode, based on the coordinate correlation value and the time correlation value; and a coordinate transform unit which transforms the set of input coordinates indicated by the second coordinate information into a set of coordinates according to the coordinate mode selected by the coordinate mode selection unit, so as to determine the set of coordinates as the output coordinates, and the coordinate transform unit (i) transforms the set of input coordinates indicated by the second coordinate information into a set of coordinates previously associated with the set of input coordinates, when the first coordinate mode is selected, and (ii) transforms the set of input coordinates indicated by the second coordinate information into a set of coordinates corresponding to output coordinates already determined for another set of input coordinates, when the second coordinate mode is selected.

With this configuration, it is possible to calculate a feature quantity corresponding to each time and coordinate point at which the touch operation is performed, without extra operation being performed by the user such as operating a physical switch and so on, and to determine a mental model of the user by integrating these, thus allowing recognizing the coordinate mode more usable for the user during performance of a natural operation and switching the coordinate mode.

Specifically, the coordinate correlation specifying unit may specify a distance between the sets of input coordinates as the coordinate correlation value and determine whether or not the specified coordinate correlation value is less than a specific threshold that is predetermined, and the time correlation specifying unit may specify a difference between the times of input as the time correlation value and determine whether or not the specified time correlation value is less than a predetermined length of specific time, and the coordinate mode selection unit may select the second coordinate mode as the coordinate mode, in the case where the coordinate correlation specifying unit determines that the coordinate correlation value is less than the specific threshold and where the time correlation specifying unit determines that the time correlation value is less than the specific time.

By thus determining, it is possible to automatically recognize the coordinate mode according to the mental model of the user operating the coordinate input device, based on, as feature quantities, an operation time spent on the touch operation and the distance between the sets of coordinates that are touched.

Preferably, the obtain and store unit may obtain the coordinate information from a coordinate input device including an input detection unit, and the first coordinate information may be coordinate information corresponding to a time at which a user releases a finger from the input detection unit, and the second coordinate information may be coordinate information corresponding to a time at which the user touches the input detection unit with a finger again after the first coordinate information is detected.

Use of such information allows recognizing the coordinate mode usable for the user, from the time at which the user performed the operation.

More preferably, the third coordinate information may be coordinate information corresponding to the time at which a user touches the input detection unit with a finger, the first coordinate information may be coordinate information corresponding to a time at which the user releases the finger from the input detection unit after the third coordinate information is detected, and the second coordinate information may be coordinate information corresponding to a time at which the user touches the input detection unit with a finger again after the first coordinate information is detected.

Use of such information allows recognizing the coordinate mode usable for the user, from the coordinates and the time at which the user performed the operation.

In addition, the obtain and store unit may further obtain, and store onto the recording medium, selection completion information including a selection completion time that is a time at which the user completes a selection operation, and the coordinate mode selection unit may obtain the selection completion information from the recording medium, and may prevent selecting or changing the coordinate mode when the time of input indicated by the first coordinate information is within a predetermined length of specific permissible time from the selection completion time.

This processing prevents switching of the coordinate mode unintended by the user from occurring as a result of a secondary release involved in clicking.

In addition, the coordinate determination apparatus may further include the coordinate input device, and the coordinate input device may receive operations performed by the user for the coordinate input and the selection, and transmit the coordinate information and the selection completion information to the obtain and store unit, the input detection unit may be a clickable touchpad capable of detecting a press operation which is a mechanical operation, and the input detection unit may specify, as the selection completion time, a time at which the user completes an operation of returning the clickable touchpad, the operation being associated with releasing the finger pressing the clickable touchpad.

With this configuration, in the coordinate input device including a clickable touchpad, it is possible to automatically recognize the coordinate mode more usable for the user during performance of a natural operation, without extra operation being performed by the user such as operating a physical switch and so on, so as to switch the coordinate mode.

In addition, the coordinate mode selection unit may calculate a degree of operation which indicates an operational feature of the user, based on at least one of pieces of coordinate information and selection information that have been obtained by the obtain and store unit prior to the second coordinate information, and may change at least one of the specific time, the specific threshold, and the specific permissible time, based on the calculated degree of operation.

With this processing, it is possible to automatically recognize, for each individual user, the coordinate mode more usable for the user during performance of a more natural operation, according to the difference in operation between each user, so as to switch the coordinate mode.

Specifically, the coordinate mode selection unit may calculate, for each piece of coordinate information among the pieces of coordinate information, a difference between a time of input indicated by the piece of coordinate information and a time of input indicated by another piece of coordinate information, and calculate, as the degree of operation, a reciprocal of an average of differences each being the calculated difference.

With this processing, it is possible to use, as the degree of operation, the user's familiarity with the coordinate input system.

Furthermore, the coordinate mode selection unit may change a value of at least one of the specific time, the specific threshold, and the specific permissible time to a smaller value when the calculated degree of operation is higher.

With this processing, as the user is more accustomed to the coordinate input system, it is possible to recognize an operation natural for the user more quickly.

In addition, a position indicated by the third coordinate information may coincide with a position indicated by the first coordinate information.

In addition, the first coordinate information may be included in a first coordinate series which is a series of coordinate information that is input during a time between when the user once touches the input detection unit with a finger and when the user releases the finger, the second coordinate information may be included in a second coordinate series which is a series of coordinate information that is input during a time between when the user touches the input detection unit with a finger again and when the user releases the finger, and the third coordinate information may be included in the first coordinate series.

Use of such various distances allows automatically recognizing the coordinate mode more usable for the user under more different conditions, so as to switch the coordinate mode.

In addition, the coordinate mode selection unit may cause a display unit to display a specific image, in the case where the predetermined length of specific time has not elapsed since the time of input indicated by the first coordinate information and where the obtain and store unit has not obtained the second coordinate information.

This display allows the user to predict the coordinate mode automatically recognized by the system.

In addition, the coordinate determination apparatus may further include an operation recognition unit which determines whether or not the first coordinate series indicates a gesture that instructs a display apparatus to start specific calculation processing, and the coordinate mode selection unit may prevent selecting the coordinate mode when the operation recognition unit determines that the first coordinate series indicates the gesture.

With this configuration, the coordinate input device that allows input of various gestures also recognizes, automatically, the coordinate mode that is usable for the user during performance of a natural operation, so as to switch the coordinate mode.

In addition, the obtain and store unit may obtain, and store onto the recording medium, grip information that is information indicating a position at which the user grips the coordinate input device, and the coordinate determination apparatus may further include a grip estimation unit which estimates a grip state that indicates a state in which the user grips the coordinate input device, using the grip information obtained from the recording medium, and the coordinate mode selection unit may change a value of one of the specific threshold, the specific time, and the specific permissible time, according to the grip state estimated by the grip estimation unit.

With this configuration, it is possible to recognize, more precisely, the coordinate mode usable for the user, so as to switch the coordinate mode.

In addition, the coordinate input device may include at least two input detection units each being the input detection unit, and the obtain and store unit may store, onto the recording medium, coordinate information obtained from a first input detection unit and coordinate information obtained from a second input detection unit, the first and the second input detection units being among the at least two input detection units.

With this configuration, in the coordinate input device including at least two input detection units, it is possible to recognize the coordinate mode usable for the user, so as to switch the coordinate mode.

In addition, the coordinate determination apparatus determines output coordinates corresponding to input coordinates, and may include: an obtain and store unit which serially obtains, from the coordinate input device, coordinate information indicating the input coordinates, and stores the coordinate information onto a recording medium; a coordinate correlation specifying unit which specifies a distance between coordinates corresponding to a center of an icon displayed on the display apparatus and output coordinates obtained by transforming, according to the absolute coordinate mode, a set of input coordinates indicated by the second coordinate information among the pieces of coordinate information stored on the recording medium; a coordinate mode selection unit which selects, as the coordinate mode, one of the absolute coordinate mode and the relative coordinate mode, based on the distance; and a coordinate transform unit which transforms the set of input coordinates indicated by the second coordinate information into a set of coordinates according to the coordinate mode selected by the coordinate mode selection unit, so as to determine the set of coordinates as the output coordinates, and the coordinate transform unit may (i) transform the set of input coordinates indicated by the second coordinate information into a set of coordinates previously associated with the set of input coordinates, when the absolute coordinate mode is selected, and (ii) transform the set of input coordinates indicated by the second coordinate information into coordinates corresponding to output coordinates already determined for another set of input coordinates, when the relative coordinate mode is selected.

With this configuration, when the user clicks the icon displayed at a specific point on the screen, the coordinate determination apparatus can automatically select the absolute coordinate mode, thus allowing the coordinate mode that suits the user intention.

Advantageous Effects of Invention

As described above, according to an implementation of the present invention, it is possible to provide a coordinate determination apparatus which can automatically recognize a coordinate mode more usable for the user during performance of a natural operation, so as to switch the coordinate mode.

BRIEF DESCRIPTION OF DRAWINGS

FIG. 1 is an external view of a coordinate input system which realizes a coordinate determination apparatus, according to an embodiment of the present invention.

FIG. 2 is a functional block diagram showing an example of the coordinate determination apparatus according to the embodiment of the present invention.

FIG. 3 is a schematic diagram showing an example of a user operation on an input detection unit, according to the embodiment of the present invention.

FIG. 4 is a schematic diagram showing an example of contact coordinates used for determining a coordinate mode, according to the embodiment of the present invention.

FIG. 5 is a state transition diagram showing coordinate mode determination processing performed on input information that is obtained after completion of pointer display, according to the embodiment of the present invention.

FIG. 6 is a state transition diagram showing coordinate mode determination processing performed on input information that is obtained before completion of the pointer display, according to the embodiment of the present invention.

FIG. 7 is a flowchart showing processing performed by the coordinate determination apparatus, according to the embodiment of the present invention.

FIG. 8 is a flowchart showing details of event processing other than Release event processing, according to the embodiment of the present invention.

FIG. 9 is a flowchart showing processing for changing a threshold and so on according to a degree of operation, according to a first variation of the embodiment of the present invention.

FIG. 10 is a schematic diagram showing an example of a distance used for determining the coordinate mode, according to a second variation of the embodiment of the present invention.

FIG. 11 is a flowchart showing processing performed by the coordinate determination apparatus, according to a third variation of the embodiment of the present invention.

FIG. 12 is an external view showing an example of a computer system that realizes the coordinate determination apparatus, according to the embodiment of the present invention.

FIG. 13 is a block diagram showing a hardware configuration of the computer system that realizes the coordinate determination apparatus, according to the embodiment of the present invention.

FIG. 14A is a flowchart for a coordinate switching means disclosed in a conventional example (Patent Literature 1).

FIG. 14B is a flowchart for the coordinate switching technique disclosed in the conventional example (Patent Literature 1).

FIG. 15A is a flowchart for a coordinate switching technique disclosed in a conventional example (Patent Literature 5).

FIG. 15B is a flowchart for the coordinate switching technique disclosed in the conventional example (Patent Literature 5).

FIG. 16 is a diagram showing a correspondence, in an absolute coordinate mode, between a trajectory on the input detection unit and a trajectory on the display apparatus.

FIG. 17 is a diagram showing a correspondence, in a relative coordinate mode, between a trajectory on the input detection unit and a trajectory on the display apparatus.

DESCRIPTION OF EMBODIMENT

First, to clarify the difference between the present invention and the conventional technique, conventional techniques for switching the coordinate mode in the coordinate determination apparatus will be described in further detail.

Conventionally, techniques for switching the coordinate mode include:

a technique of switching between an absolute coordinate mode and a relative coordinate mode depending on an application, such as switching by the user pressing an ESC key (for example, see Patent Literature 1);

a technique of directing the user to operate a physical switching button (switch) provided on an input detection unit 210 (for example, see Patent Literature 2);

a technique of switching according to a pointer position on a display unit 230 (for example, see Patent Literatures 1 and 3);

a technique assuming that an input detection unit 210 is separately provided for each of the input in the absolute coordinate mode and the input in the relative coordinate mode (for example, see Patent Literature 4);

a technique of switching the coordinate mode according to a size of contact area of a finger on the touchpad (for example, see Non Patent Literature 1); and a technique of switching the coordinate mode according to a time interval for providing input to the touchpad (for example, see Patent Literature 5).

Figure 14A:
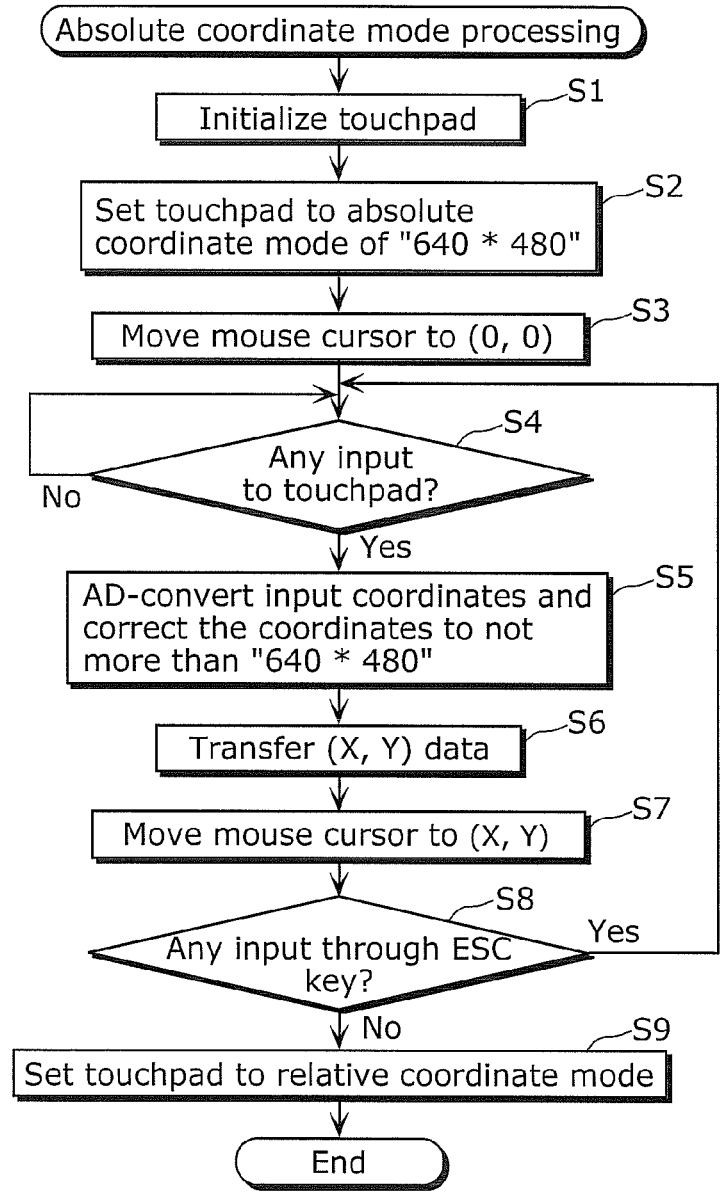
[FIG. 14A]
Figure 14B:
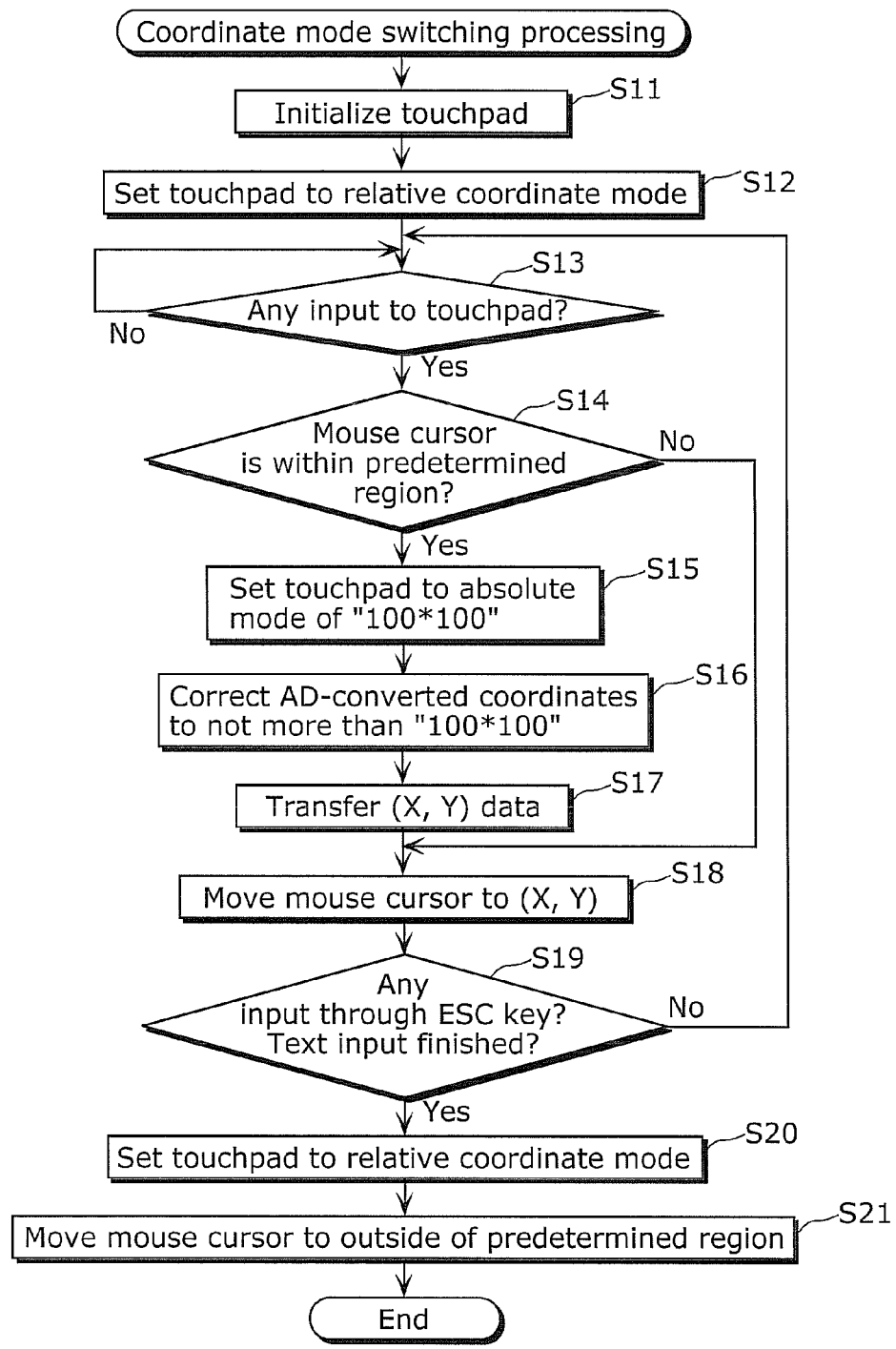
[FIG. 14B]

FIGS. 14A and 14B are flowcharts each showing conventional processing of switching the coordinate mode as described in Patent Literature 1.

As shown in FIG. 14A, a coordinate input system sets the coordinate mode to the absolute coordinate mode in step S2.

Next, in step S4, the coordinate input system corrects, within a size determined in step S5 (into the absolute coordinate mode), the coordinates that the user has input into the touchpad.

Subsequently, in step S8, as long as the coordinate input system detects an input by the user from the ESC key, the coordinate input system continues the processing described above.

In addition, in step S8, if the coordinate input system does not detect an input by the user from the ESC key, the coordinate input system switches the coordinate mode to the relative coordinate mode in step S9.

Furthermore, as shown in FIG. 14B, the coordinate input system determines, in step S14, whether or not a mouse cursor (pointer) is within a predetermined region.

When the mouse cursor (pointer) is within the predetermined region, the coordinate input system switches the coordinate mode from the relative coordinate mode to the absolute coordinate mode in step S15. Subsequently, in step S19, until the coordinate input system detects the input from the ESC key, the coordinate input system sets the coordinate mode to the absolute coordinate mode.

Thus, the switching of the coordinate mode in Patent Literature 1 is performed by detecting the input by the user from the ESC key.

In addition, Patent Literature 5 suggests switching the "input mode", using the time interval for providing input to the touch pad.

Figure 15A:
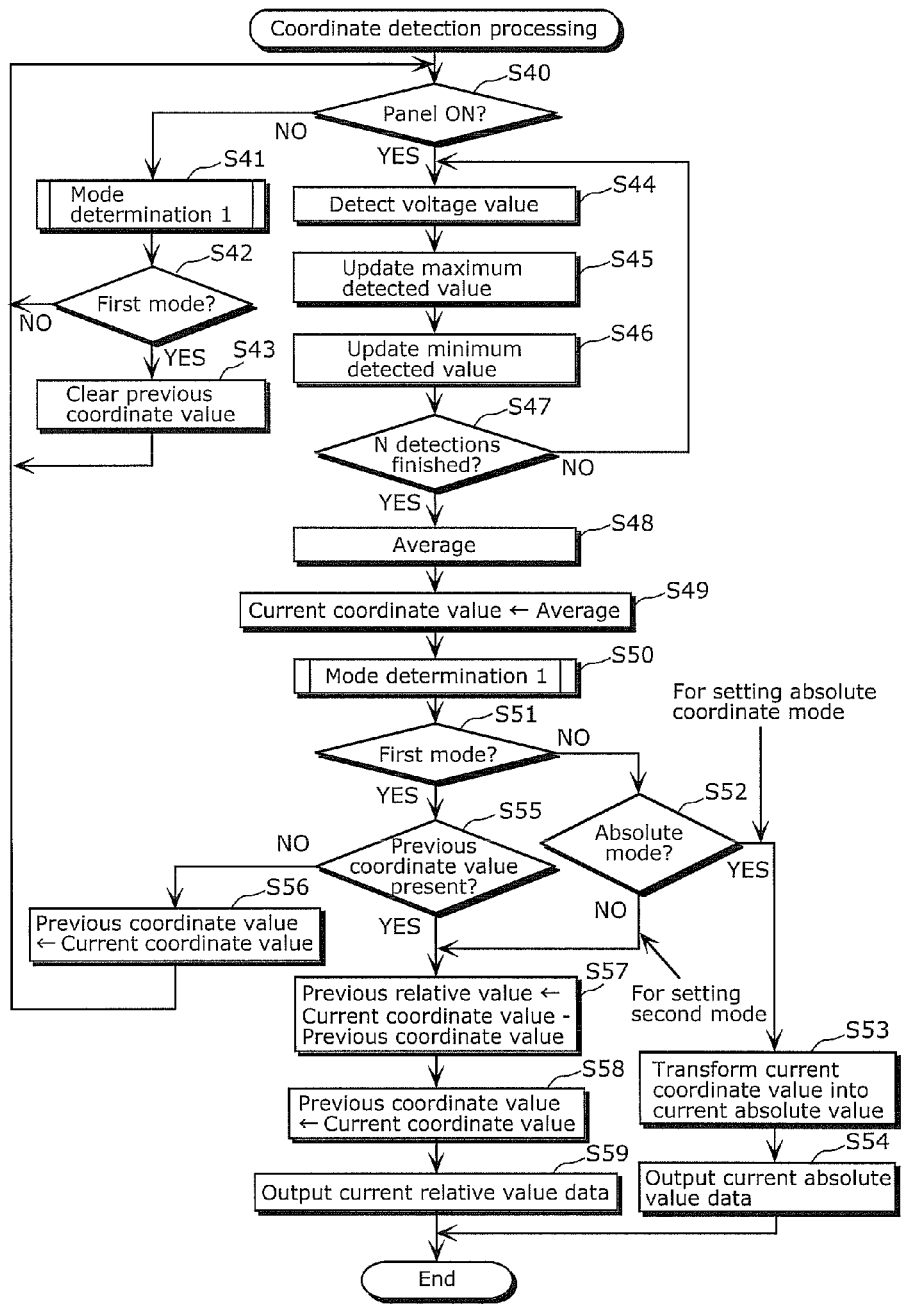
[FIG. 15A]
Figure 15B:
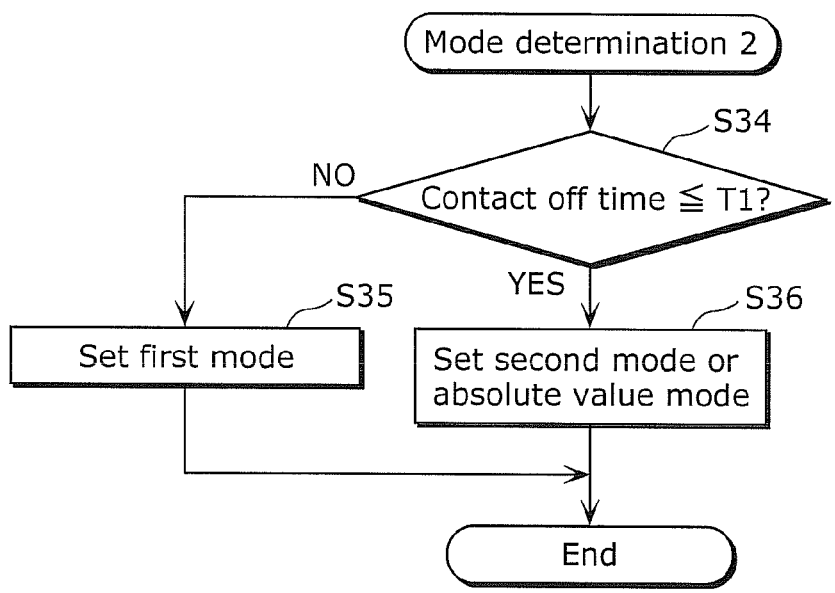
[FIG. 15B]
Figure 16:
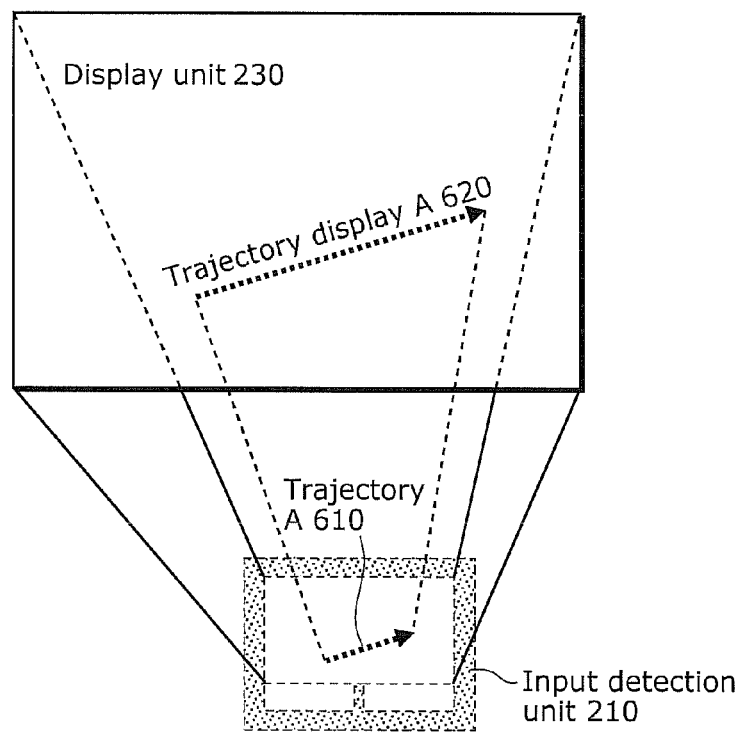
[FIG. 16]

FIGS. 15A and 15B are flowcharts each showing conventional coordinate mode switching processing in the coordinate input system described in Patent Literature 5. In steps S44 to S49 shown in FIG. 15A, an average of n coordinate inputs provided onto the touchpad is calculated, so as to determine, in step S50, the coordinate mode based on this average as an input coordinate value.

This determination of the coordinate mode, as represented by step S34 in FIG. 15B, is performed with reference to "whether or not the interval for providing input onto the touchpad is within a given length of time". More specifically, when the interval is not within the given length of time, the mode is switched to an input mode referred to as a "first mode" in step S35, while the mode is switched to a "second mode or absolute value mode" in step S36 when the interval is within the given length of time.

However, the first mode and the second mode as disclosed in Patent Literature 5 are different only in whether or not a process of determination as to if there is "any previous coordinate value is present?" in step S55 is included, and in practical coordinate processing, a "relative value of the current input coordinate value with respect to the previous input coordinate value" in steps S57 to S59 is output.

In other words, in the invention disclosed in Patent Literature 5, in both the first mode and the second mode, the mode is set to what is referred to as the relative coordinate mode in which the "relative value between input coordinate values" is output.

Furthermore, Patent Literature 5 fails to disclose a criterion used by the coordinate input system for determining which one of the second mode and the absolute value mode should be used. In other words, Patent Literature 5 merely has a description that whether or not to use the absolute value mode is determined only by a setting using the physical switch (described as "switch 5" in Patent Literature 5) (Patent Literature 5 has a description as follows: [0032] In addition, the switch 5 switches between the absolute value mode and the relative value mode of the coordinate input panel 10, using the power supply voltage 29. By the switching using the switch 5, CPU3 detects the coordinate value by switching between the absolute value mode and the relative value mode.)

As described above, none of the conventional techniques disclose, as the problem to be solved by the invention, switching of the coordinate mode to be used by the coordinate input device by estimating the user's input intention (that is, whether the user intends to input the coordinates as absolute coordinates or relative coordinates) from the user's input operation, regardless of the application.

More specifically, to give an example of the touchpad for description, the operation according to the relative coordinate mode is based on a "repetition of a similar operation" such as "slide the finger on the touchpad, release it, move it back to near a start point, and slide it on the pad".

On the other hand, in the operation according to the absolute coordinate mode, to "reach the destination at a time without releasing the finger from the touchpad" is a basic (implicitly performed) mental model of the user operating on the touchpad.

Conventionally, no such technique has been suggested as switching the coordinate mode by selecting a "practically usable" coordinate mode based on the mental model that suits an actual use situation for the user.

Specifically, conventional techniques have problems as follows.

Each time the user wants to switch the coordinate mode, the user needs to perform the coordinate mode switching operation using a particular button, a switch, an input detection unit, and so on (Patent Literatures 1, 2, 4, and 5).

In order to switch the coordinate mode, the user is forced to move the pointer to a particular position, and this moving the pointer to the particular position forcibly causes switching, thus not allowing free switching of the operation system (Patent Literatures 1 and 3).

The user is forced to learn a novel (not general) operation such as operating a pointer while controlling the contact area of the finger so as to switch the coordinate mode, and is also forced to do an operation which is difficult to perform (Non Patent Literature 1).

Thus, the conventional technique has a fundamental problem of not allowing automatic switching of the coordinate during performance of an operation natural for the user.

In addition, providing the physical button and so on and a plurality of input devices is a factor of cost increases. Even if a virtual switching button is provided on the screen, this does not allow an intuitive operation due to the requirement of switching each time, and further adds limitations to screen design and device design.

By contrast, according to the present invention, it is possible to solve the above conventional problems by providing a coordinate determination apparatus that allows appropriate selection of the coordinate mode according to the user's mental mode at the time of the input operation, based on the input operation performed by the user.

The following describes an embodiment of the present invention with reference to the drawings.

Figure 1:
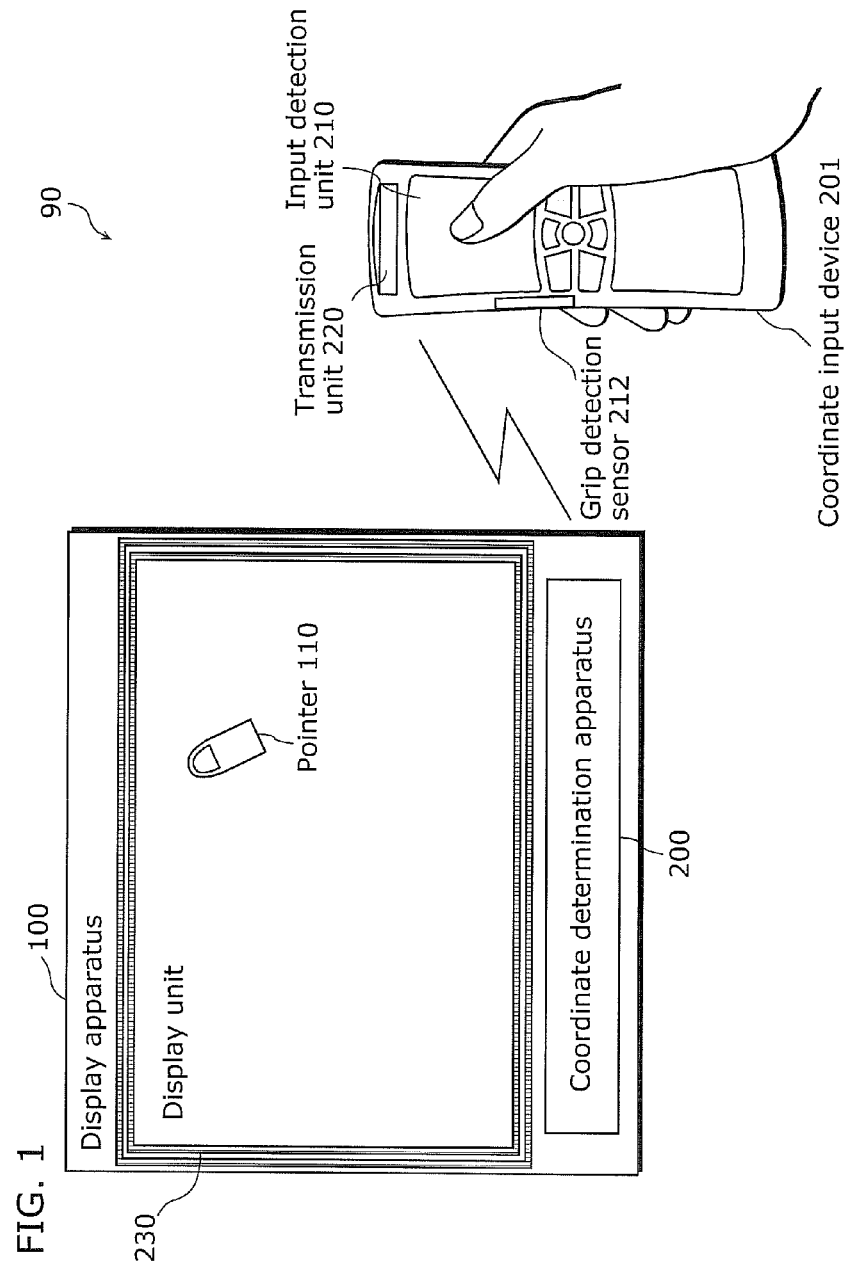
[FIG. 1]

FIG. 1 is an external view of a coordinate input system 90 that is realized using a coordinate determination apparatus 200 according to the present invention, in the present embodiment. The coordinate input system 90 includes a display apparatus 100 and a coordinate input device 201.

The display apparatus 100 is an apparatus which receives an input provided by the user from the coordinate input device 201 and displays, on the display unit 230, a processing result corresponding to the input. For example, the display device 100 can be a television set, a video recording and reproduction apparatus, and so on, but is not limited to these examples.

The coordinate input device 201 is an input device with which information of the operation by the user is input into the display device 100 that is connected with and without wires. For example, the coordinate input device 201 can be a remote controller and so on of a television set, a video recording and reproduction apparatus, and so on, but is not limited to these examples.

In addition, the display apparatus 100 includes a coordinate determination apparatus 200 and a display unit 230.

The coordinate determination apparatus 200 obtains input information that is input by the user into the coordinate input device 201, and displays the input information on the display unit 230.

The coordinate determination apparatus 200 according to the present embodiment automatically determines the coordinate mode more usable for the user, transforms input coordinates obtained from within the coordinate input device 201, into a pointer coordinate position according to the determined coordinate mode, and then outputs the pointer coordinate position to the display unit 230.

In other words, the pointer coordinate position is represented by output coordinates from the coordinate determination apparatus 200.

The display unit 230 is a visual display device included in the display apparatus 100. For example, the display unit can be an LCD, a cathode ray tube (CRT), and so on, but is not limited to these examples. The display unit 230 displays a pointer 110 at a pointer coordinate position output by the coordinate determination apparatus 200.

The pointer 110 is a small figure displayed, in a graphical user interface (GUI) environment, so as to display an operation target. When an operation is performed onto the coordinate input device 201, the pointer 110 on the display 230 moves. For example, the pointer 110 is a figure or the like having a shape of an arrow, a finger, and the like.

In addition, the coordinate input device 201 includes an input detection unit 210, a grip detection sensor 212, and a transmission unit 220.

The input detection unit 210 is a pointing device with which the input information is obtained. The device used for the input detection unit 210 can be, for example, a touchpad, a tablet, and a trackball.

The input information obtained by the input detection unit 210 is mainly coordinate information and selection information.

The coordinate information includes, for example, input coordinates and a time of input at which the input coordinates are input by the user touching the input detection unit 210. In other words, the coordinate determination apparatus 200 determines the pointer coordinate position that is a set of output coordinates, from the input coordinates included in the coordinate information.

The input coordinates included in the coordinate information correspond to the point touched by the user with a finger on the input detection unit 210.

Note that the input coordinates are represented as a value indicating, for example, a point on a two-dimensional or three-dimensional space.

The user, for example, can move the pointer 110 by entering the coordinate information using the input detection unit 210.

Next, the selection information is input information indicating either a start or an end of a selection operation that is input by the user tapping, clicking, or the like on the input detection unit 210. Specifically, the selection information is one of: selection start time information indicating a start time of the selection; and selection finish time information indicating a finish time of the selection.

For example, when the input detection unit 210 is a clickable touchpad, the input detection unit 210 outputs, as the selection start time information, a time at which the user completes pressing the input detection unit 210.

In addition, when the user releases the finger from the input detection unit 210, the input detection unit 210 outputs, as the selection finish time information, a time at which the input detection unit 210 retunes to an original position (at which a return operation of the clickable touchpad is completed) using a spring mechanism of the clickable touchpad.

By entering the selection information using the input detection unit 210, the user, for example, is able to select an icon displayed on the display unit 230 and perform processing associated with the icon.

Furthermore, a combination of the selection information and coordinate information allows, for example, a drag operation.

The grip detection sensor 212 is a sensor which detects a position at which the user grips a chassis of the coordinate input device 201 and outputs a result of the detection as grip information.

For example, it is possible to consider that only the grip detection sensor 212 provided at the point gripped by the user outputs ON information which indicates, while the position is being gripped, that the position is being gripped.

With such a grip detection sensor 212 provided in an outer rim, a back face, and so on of the chassis of the coordinate input device 201, the coordinate determination apparatus 200 obtains, for example, information for determining whether the user grips the coordinate input device 201 with a left hand or a right hand.

The detection method used for the grip detection sensor 212 can be considered to be of a resistive type, an infrared type, a SAW type, a static type, and so on, but is not limited to these types.

The transmission unit 220 is a communication interface. The transmission unit 220 transmits the input information detected by the input detection unit 210, to the coordinate determination apparatus 200. The input information transmitted by the transmission unit 220 is specifically: a plurality of pieces of information including coordinate information, selection information, grip information and so on.

A communication method used by the transmission unit 220 can be a wireless LAN, infrared communication, Near Field Communication, and so on, but is not limited to these methods.

Note that the coordinate input device 201 and the coordinate determination apparatus 200 may include, although not shown in FIG. 1, a computing device such as a central processing unit (CPU) and a storage device such as a read only memory (ROM) and a random access memory (RAM).

With the configuration described above, by performing an operation on the input detection unit 210 included in the coordinate input device 201, the user can move, to a desired position, the pointer 110 that is displayed on the display unit 230 in the display apparatus 100. In addition, this allows the user to select the desired icon.

Note that the input detection unit 210 in FIG. 1 is assumed as a generally available device such as, to say nothing of a touchpad and a touch panel, a mouse for a personal computer (including a general scroll mouse, and an arbitrary mouse which allows pointing in the midair such as Air Mouse (registered trademark) MX Air of Logicool, a mid-air pointing device (a remote controller of Wii (registered trademark)) of a camera type, and a tablet input device.

In addition, although the coordinate input device 201 and the coordinate determination apparatus 200 are separately provided in FIG. 1, the coordinate input device 201 and the coordinate determination apparatus 200 may be integrated.

Figure 2:
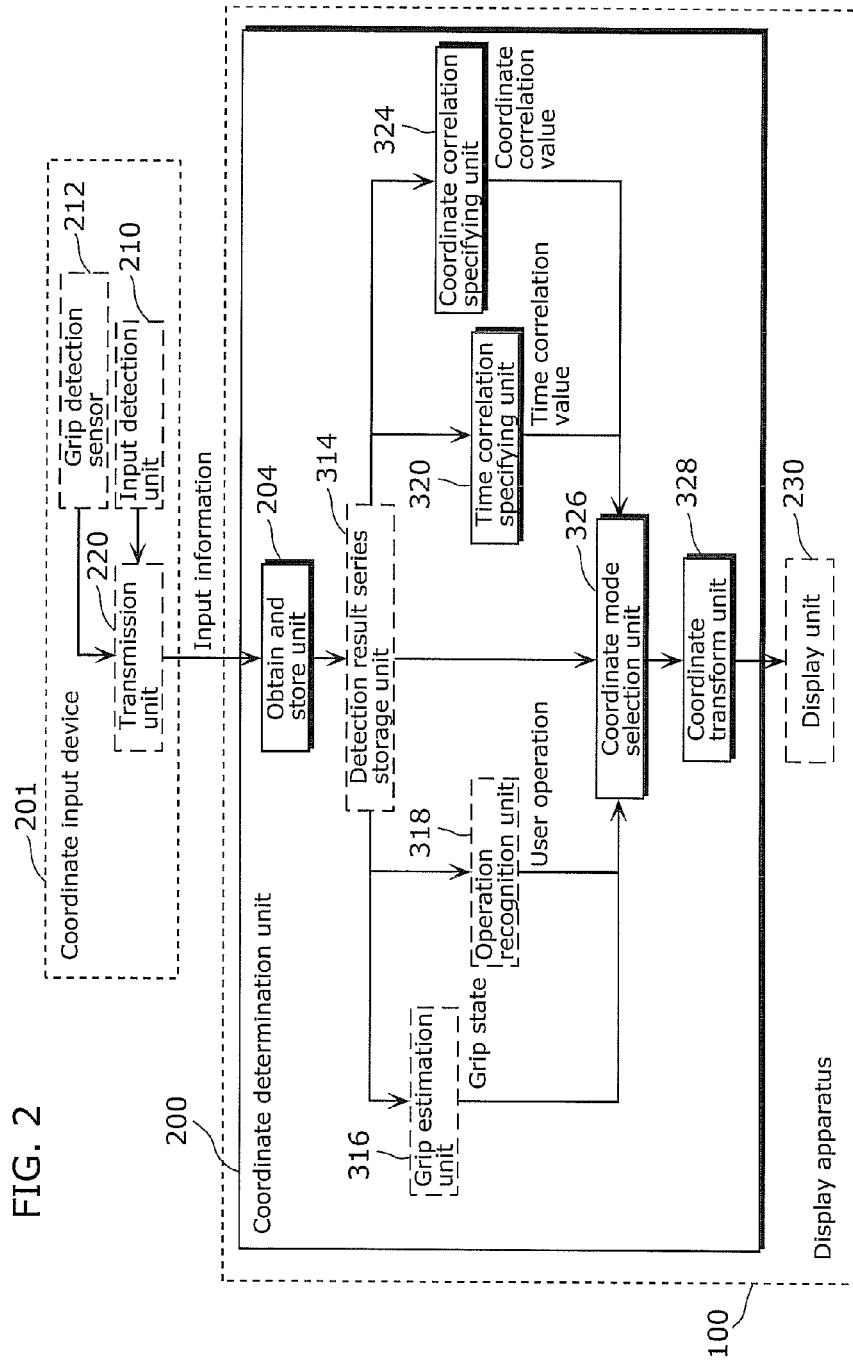
[FIG. 2]

FIG. 2 is a block diagram showing a functional configuration of the coordinate input device 201 and the display apparatus 100 according to the present embodiment. Note that the same constituent element as that in FIG. 1 is assigned with the same reference sign and the description thereof is omitted.

The coordinate determination apparatus 200 includes: an obtain and store unit 204, a detection result series storage unit 314, a grip estimation unit 316, an operation recognition unit 318, a time correlation specifying unit 320, a coordinate correlation specifying unit 324, a coordinate mode selection unit 326, and a coordinate transform unit 328.

The obtain and store unit 204 serially obtains, wiredly and wirelessly, input information (coordinate information, selection information, grip information, and so on) transmitted from the coordinate input device 201, and stores the input information in the detection result series storage unit 314.

The detection result series storage unit 314 is a recording medium and is realized by, for example, a random access memory (RAM) and so on.

The grip estimation unit 316 obtains, from the detection result series storage unit 314, grip information output from the grip detection sensor 212. Subsequently, the grip estimation unit 316 estimates a grip status of the user from the grip information, and outputs a result of the estimation to the coordinate mode selection unit 326.

The operation recognition unit 318 obtains input information (coordinate information, selection information, and so on) from the detection result series storage unit 314, and recognizes whether or not the input information matches one of a plurality of predetermined "events". Subsequently, the operation recognition unit 318 notifies the coordinate mode selection unit 326 of a result of the recognition.

The type of the events to be recognized by the operation recognition unit 318 can be, for example: "Move (the pointer)", "Release", "Gesture (slide, flick, or the like)", and "Select".

Of these, a Select event and a Release event are events that can be recognized from a piece of selection information.

On the other hand, a Move event and a Gesture event cannot be distinguished from each other until a series of coordinate information is obtained. In this case, it is possible to consider that the operation recognition unit 318, after recognizing a series of coordinate information as the Move event, which is, for example, a gesture of drawing a circle, recognizes the series of coordinate information separately as the Gesture event.

Next, the time correlation specifying unit 320 specifies, as a time correlation value, a correlation between an input time indicated by first coordinate information and an input time indicated by second coordinate information, both of which information is among the pieces of coordinate information obtained from the detection result series storage unit 314, and outputs the time correlation value to the coordinate mode selection unit 326.

Here, to "specify a correlation as a time correlation value" is, for example, to calculate a difference between the input time at which the first coordinate information is input and the input time at which the second coordinate information is input, and compare the difference with a predetermined length of specific time.

In other words, the time correlation specifying unit 320 outputs, as the time correlation value, a size relationship between the specific time and the difference between the two input times, to the coordinate mode selection unit 326.

Next, the coordinate correlation specifying unit 324 specifies, as the coordinate correlation value, a correlation between input coordinates indicated by third coordinate information and input coordinates indicated by the second coordinate information, among the pieces of coordinate information obtained from the detection result series storage unit 314, and outputs the coordinate correlation value to the coordinate mode selection unit 326.

Here, to "specify a correlation as the coordinate correlation value" is, for example, to calculate a distance between the input coordinates indicated by the third coordinate information and the input coordinates indicated by the second coordinate information, and compare the distance with a specific threshold that is predetermined.

In other words, the coordinate correlation specifying unit 324 outputs, as the coordinate correlation value, a size relationship between the specific threshold and the distance between the two sets of input coordinates, to the coordinate mode selection unit 326.

The coordinate mode selection unit 326 determines the coordinate mode from one of the absolute coordinate mode (that is, the first coordinate mode) and the relative coordinate mode (that is, the second coordinate mode), based on the result of the specification obtained from the coordinate correlation specifying unit 324 and the time correlation specifying unit 320.

For example, when the difference between the time at which the first coordinate information is input and the time at which the second coordinate information is input is less than the specific time and when the distance between the set of input coordinates indicated by the third coordinate information and the set of input coordinates indicated by the second coordinate information is within the specific threshold, it is possible to consider that the coordinate mode selection unit 326 determines the relative coordinate mode as the coordinate mode. A more detailed determination method will be described later.

The coordinate transform unit 328 transforms the input coordinates indicated by the coordinate information into a pointer coordinate position on the display unit 230, according to the coordinate mode determined by the coordinate mode selection unit 326, and outputs the pointer coordinate position resulting from the transform, onto the display unit 230.

Figure 17:
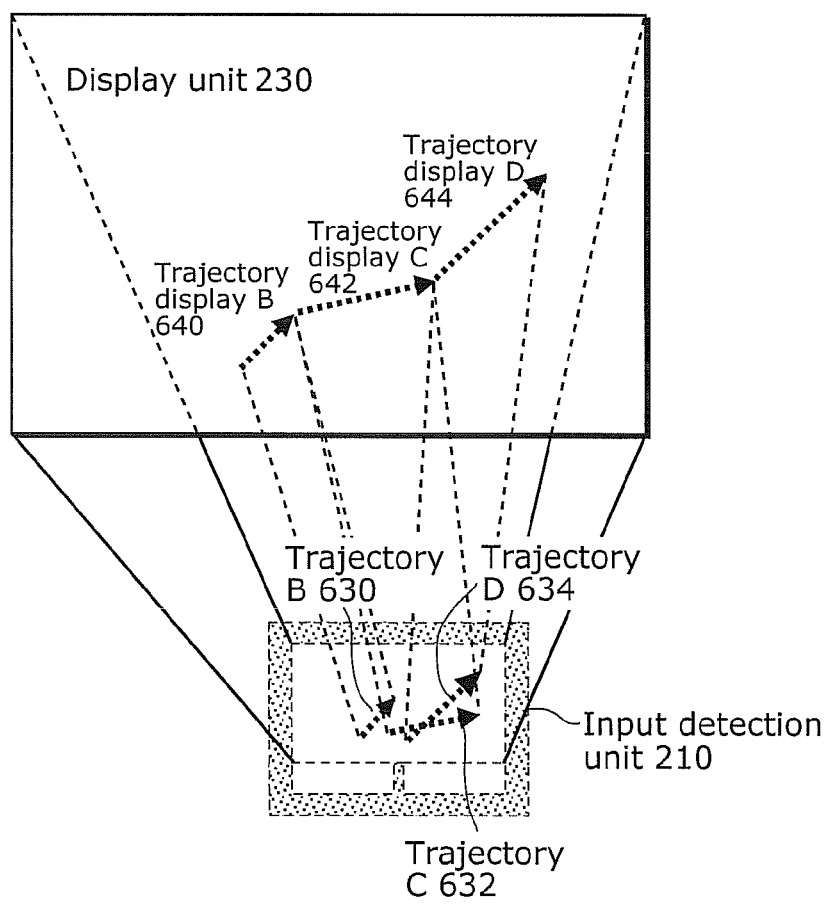
[FIG. 17]

To give a specific description with reference to FIG. 17, it is assumed that the user has just input a trajectory B630, has released the finger from the input detection unit 210, and has touched a beginning of a trajectory C632. In addition, it is assumed that the coordinate mode selection unit 326 has determined the coordinate mode to be the relative coordinate mode.

In this case, the coordinate transform unit 328 transforms the input coordinates corresponding to the beginning of the trajectory C632, into a pointer coordinate position corresponding to an end of a trajectory display B640, and outputs the pointer coordinate position to the display unit 230.

In other words, the coordinate transform unit 328 transforms the input coordinates corresponding to the beginning of the trajectory C632 into a set of coordinates corresponding to the end of the trajectory display B640, which are output coordinates already determined for another set of input coordinates.

In addition, when the coordinate mode is the absolute coordinate mode, the coordinate transform unit 328 transforms the input coordinates corresponding to the beginning of the trajectory C632 into a set of coordinates previously associated with the input coordinates. The coordinate transform unit 328 performs this association according to a static rule (that is determined irrelevant to coordinate information except the coordinate information corresponding to the beginning of the trajectory C632).

Note that the coordinate determination apparatus 200 according to an implementation of the present invention allows achieving the object of the present invention, even in the case of including only: the obtain and store unit 204, the time correlation specifying unit 320, the coordinate correlation specifying unit 324, the coordinate mode selection unit 326, and the coordinate transform unit 328.

In other words, even if the detection result series storage unit 314 is not included in the coordinate determination unit 200 as a constituent element, and if, for example, the coordinate input device 201 or the display apparatus 100 other than the coordinate determination apparatus 200 includes the detection result series storage unit 314, it is possible to achieve an implementation of the present invention.

In addition, even if the grip estimation unit 316 is not included in the coordinate determination apparatus 200 as a constituent element, and if, for example, the coordinate input device 201 estimates the grip status and the coordinate determination apparatus 200 obtains the estimation result, it is possible to achieve an implementation of the present invention. In addition, as described later, since the coordinate mode selection unit 326 uses the grip status simply as additional information for selecting the coordinate mode, it is possible to achieve an implementation of the present invention even if the coordinate mode selection unit 326 does not use the grip status.

In addition, even if the operation recognition unit 318 is not included in the coordinate determination apparatus 200 as a constituent element, and if, for example, the coordinate input device 201 recognizes the user operation and the coordinate determination apparatus 200 obtains the recognition result, it is possible to perform an implementation of the present invention. In addition, in the case of limiting the types of events that occur, such as a system intended only for moving the pointer 110, it is possible to know what event has occurred without recognizing the operation by the user. Thus, without including the operation recognition unit 318, it is possible to perform the present invention.

Next, an outline of coordinate mode selection processing that is performed by the coordinate mode selection unit 326 is described with reference to FIGS. 3 to 6.

Figure 3:
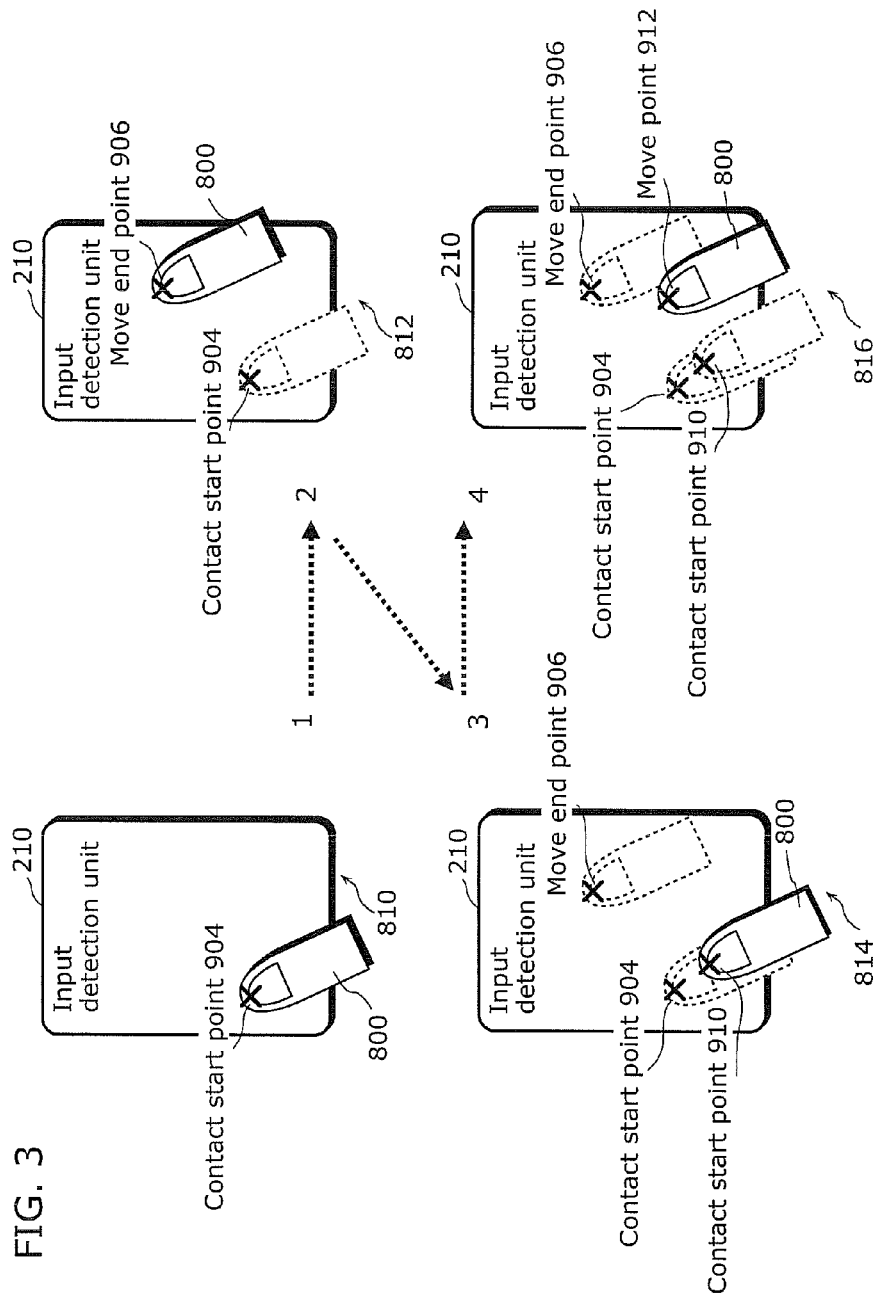
[FIG. 3]

FIG. 3 is a diagram showing an example of the user operation in the input detection unit, which is related to determination of the coordinate mode in the present embodiment.

As shown in FIG. 3, the user operates the input detection unit 210 in order, from a first input state 810 to a fourth input state 816.

In the first input state 810, a current finger position 800 is at a contact start point 904. As the third coordinate information in the present invention, it is possible to consider using, for example, the input coordinates and a time of input of the contact start point 904.

In the second input state 812, after moving the finger on the input detection unit 210, the user is about to release the finger from a move end point 906 on the input detection unit 210. For example, as the first coordinate information according to the present invention, it is possible to consider using the input coordinates and the time of input of the move end point 906 immediately before the finger is released from the input detection unit 210.

In the third input state 814, the user once releases the finger from the move end point 906 and places the finer again on a contact start point 910. As the second coordinate information according to the present invention, it is possible to consider using, for example, the input coordinates and the time of input of the contact start point 910.

In the fourth input state 816, the user is in the middle of moving the finger on the input detection unit 210, and the current finger position 800 is at a move point 912.

Note that a series of coordinate information that is input during a period of time between when the user once touches the contact start point 904 on the input detection unit 210 and when the user releases the finger at the move end point 906 is considered to be a first coordinate series.

In addition, a series of coordinate information that is input after the input of the first coordinate series during a time between when the user touches the contact start point 910 on the input detection unit 210 again and passes via the move point 912 and when the user releases the finger is considered to be a second coordinate series.

Figure 4:
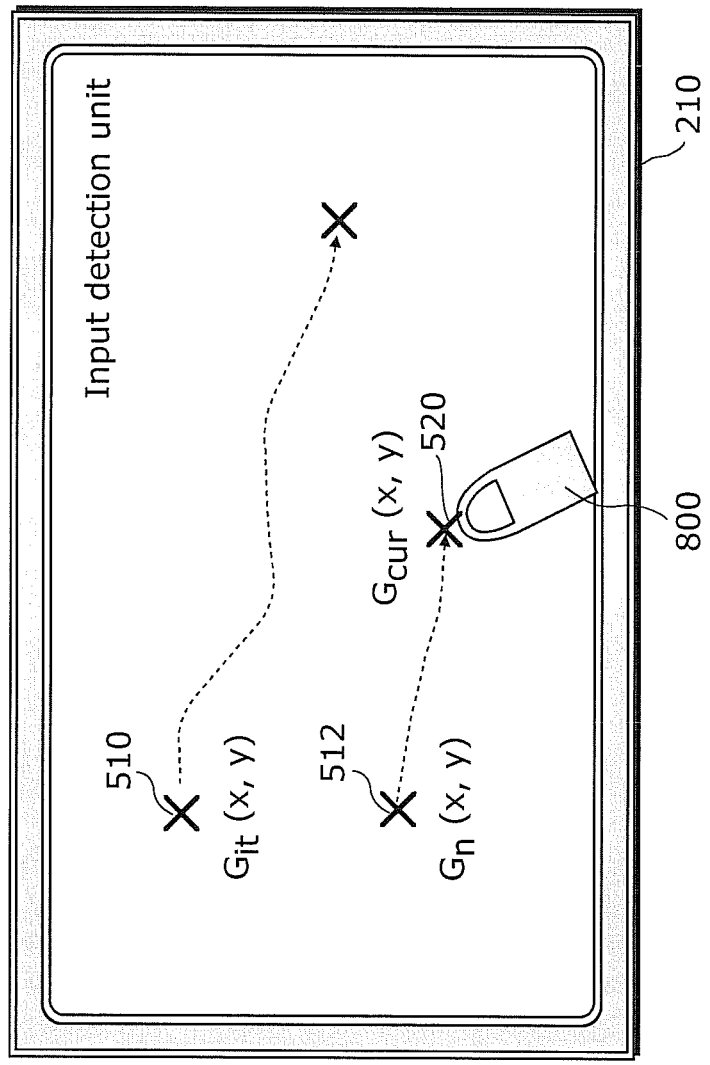
[FIG. 4]

Next, FIG. 4 is a diagram showing G_it(x, y) 510, G_n(x, y) 512, and G_cur(x, y) 520 each of which represents coordinates on the input detection unit 210.

G_it(x, y) 510 indicates a beginning of the first coordinate series. Accordingly, the contact start point 904 in FIG. 3 is G_it(x, y) 510.

G_n(x, y) 512 indicates a beginning of the second coordinate series. Accordingly, the contact start point 910 in FIG. 3 is G_n(x, y) 512.

G_cur (x, y) 520 is coordinates that currently contact the input detection unit 210. Accordingly, the move point 912 in FIG. 3 is G_cur (x, y) 520.

The coordinate mode selection unit 326 selects the coordinate mode, using input coordinates such as G_it(x, y) 510, G_n(x, y) 512, and G_cur (x, y) 520, input time, grip information, and so on.

Figure 5:
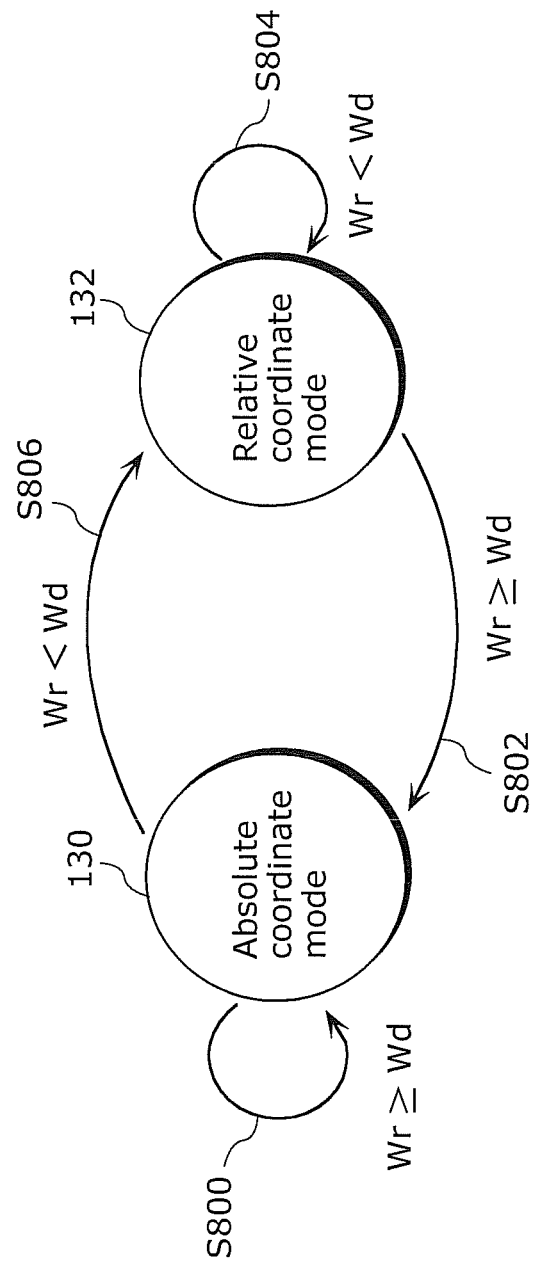
[FIG. 5]

FIG. 5 is a state transition diagram showing an example of coordinate mode determination processing performed by the coordinate mode selection unit 326, in the present embodiment.

The coordinate mode selection unit 326 selects one of an absolute coordinate mode 130 and a relative coordinate mode 132 as the coordinate mode for displaying, on the display unit 230, G_n(x, y) 512 that is the beginning of the second coordinate series obtained from the input detection unit 210. In other words, the coordinate mode selection unit 326 selects the coordinate mode for outputting, as the pointer coordinate position, the input coordinates indicated by the second coordinate information.

Here, for the purpose of description, it is assumed that the current coordinate mode is the absolute coordinate mode 130.

In addition, it is assumed that Wr represents a period of time between when the user inputting the coordinate information releases the finger from the input detection unit 210 and when the user touches the input detection unit 210 with the finger again.

Specifically, Wr represents a difference in time between when the user releases the finger from the input detection unit 210 at the move end point 906 and when the user places the finger again at the contact start point 910 on the input detection unit 210. More specifically, Wr is assumed to be a difference between the time of input indicated by the first coordinate information and the time of input indicated by the second coordinate information.

In this context, the time correlation specifying unit 320 compares Wr with a specific time Wd and notifies the coordinate mode selection unit 326 of the time correlation value that indicates whether or not Wr is greater than or equal to the specific time Wd. The coordinate mode selection unit 326 receives the notification, and when Wr is greater than or equal to the specific time Wd, selects the absolute coordinate mode 130 as the coordinate mode (S800).

In addition, the coordinate mode selection unit 326 receives the notification, and when Wr is less than the specific time Wd, selects the relative coordinate mode 132 as the coordinate mode (S806).

On the other hand, it is assumed that the current coordinate mode is the relative coordinate mode 132.

In this context, likewise, the time correlation specifying unit 320 compares Wr with the specific time Wd and notifies the coordinate mode selection unit 326 of a time correlation value that indicates whether or not Wr is greater than or equal to the specific time Wd.

The coordinate mode selection unit 326 receives the notification, and when Wr is greater than or equal to the specific time Wd, selects the absolute coordinate mode 130 as the coordinate mode (S802).

In addition, the coordinate mode selection unit 326 receives the notification, and when Wr is less than the specific time Wd, selects the relative coordinate mode 132 as the coordinate mode (S804).

Figure 6:
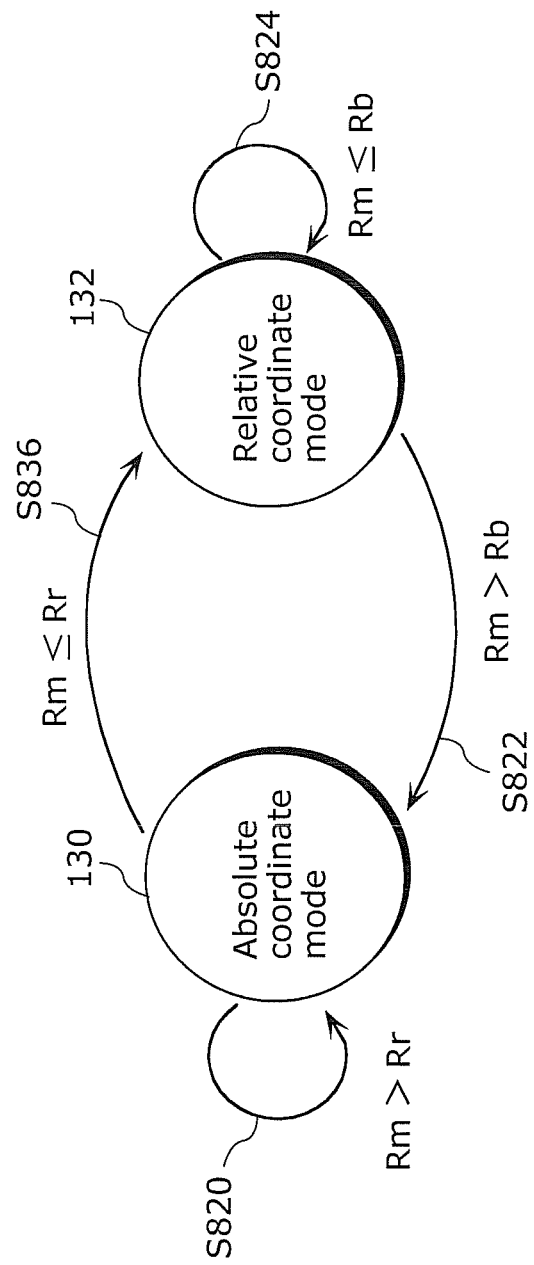
[FIG. 6]

In addition, FIG. 6 is a state transition diagram showing another example of the coordinate mode determination processing that is performed by the coordinate mode selection unit 326, in the present embodiment.

As in FIG. 5, the coordinate mode selection unit 326 selects one of the absolute coordinate mode 130 and the relative coordinate mode 132 as the coordinate mode for displaying, on the display unit 230, G_n(x, y) 512 that represents the beginning of the second coordinate series obtained from the input detection unit 210.

Here, for the purpose of description, it is assumed that the current coordinate mode is the absolute coordinate mode 130.

In addition, it is assumed that Rm is a distance between two points, that is, an initial contact position G_it(x, y) 510 and an initial position G_n(x, y) 512.

Specifically, Rm represents a distance between the contact start point 904 and the contact start point 910. More specifically, it is assumed that Rm is a difference between the input coordinates indicated by the third coordinate information and the input coordinates indicated by the second coordinate information.

In this context, the coordinate correlation specifying unit 324 compares Rm with a specific threshold Rr and notifies the coordinate mode selection unit 326 of a coordinate correlation value that indicates whether or not Rm is greater than the specific threshold Rr. The coordinate mode selection unit 326 receives the notification, and when Rm is above the specific threshold Rr, selects the absolute coordinate mode 130 as the coordinate mode (S820).

In addition, the coordinate mode selection unit 326 receives the notification, and when Rm is less than or equal to the specific threshold Rr, selects the relative coordinate mode 132 as the coordinate mode (S836).

On the other hand, it is assumed that the current coordinate mode is the relative coordinate mode 132.

In this context, the coordinate correlation specifying unit 324 compares Rm with a specific threshold Rb and notifies the coordinate mode selection unit 326 of a coordinate correlation value that indicates whether or not Rm is greater than the specific threshold Rb.

The coordinate mode selection unit 326 receives the notification, and when Rm is greater than the specific threshold Rb, selects the absolute coordinate mode 130 as the coordinate mode (S822).

In addition, the coordinate mode selection unit 326 receives the notification, and when Rm is less than or equal to the specific threshold Rb, selects the relative coordinate mode 132 as the coordinate mode (S824).

This is the outline of the processing performed by the coordinate mode selection unit 326.

Figure 7:
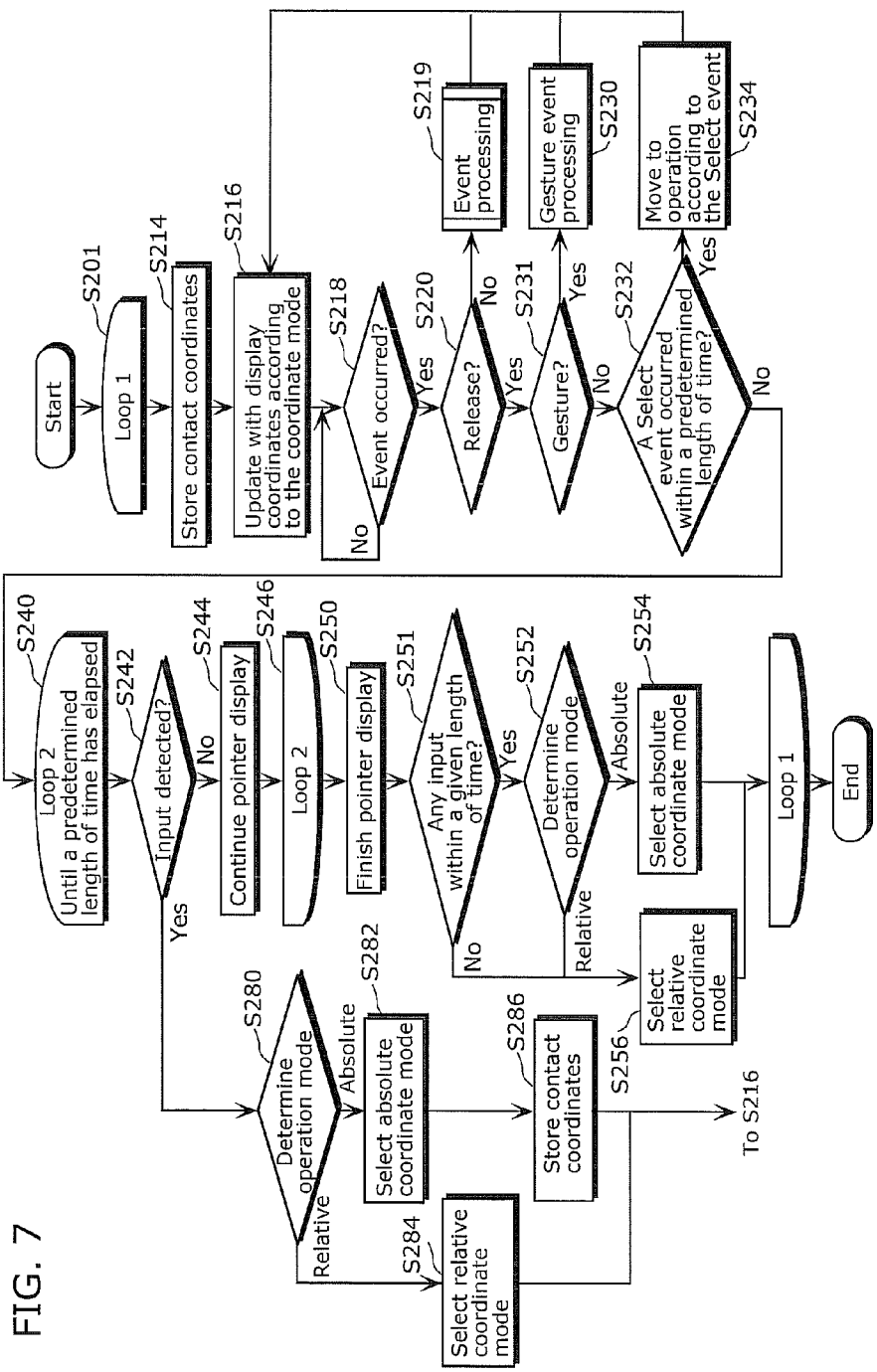
[FIG. 7]

FIG. 7 is a flowchart showing specific processing performed by the coordinate determination apparatus 200, in the present embodiment.

Note that for the purpose of description, the description hereinafter is given assuming the absolute coordinate mode for an initial state.

In addition, it is assumed that the user does not touch the input detection unit 210 at the beginning.

First, it is assumed that the user grips the coordinate input device 201 and touches the input detection unit 210 with a finger. As a result, the transmission unit 220 transmits, as input information, a signal detected by the input detection unit 210 and the grip detection sensor 212, to the obtain and store unit 204. The obtain and store unit 204 stores the obtained input information to the detection result series storage unit 314.

Next, the coordinate mode selection unit 326 obtains coordinate information from the detection result series storage unit 314 and stores, as G_it(x, y) 510, input coordinates included in the coordinate information (S214).

Note that at this point, the user does not move the finger on the input detection unit 210, so that G_it(x, y) 510 and G_cur(x, y) 520 coincide with each other.

Next, the coordinate transform unit 328 transforms G_cur(x, y) 520 that is the obtained input coordinates, into a pointer coordinate position corresponding to the absolute coordinate mode 130 that is the current coordinate mode, and outputs the pointer coordinate position to the display unit 230.

As a result, the display unit 230 updates the pointer coordinate position held for displaying the pointer 110 with the pointer coordinate position corresponding to G_cur (x, y) 520 (S216).

Thus, the pointer 110 is displayed at the pointer coordinate position on the display unit 230, which corresponds to the input coordinates touched by the user with the finger on the input detection unit 210.

Note that when representing, in a function M, the coordinate transform processing performed by the coordinate transform unit 328, the processing of transforming G_cur (x, y) 520 in the absolute coordinate mode, into a pointer coordinate position P(X, Y) on the display unit 230 is represented by: P(X, Y)=M(x, y). In other words, the coordinate transform unit 328 determines the pointer coordinate position P(X, Y), only by the input coordinates (x, y) included in the coordinate information at the moment of the contact.

On the other hand, the coordinate transform processing in the relative coordinate mode is represented by: P(x, y)=M(x, y, X_pre, Y_pre). That is, the coordinate transform unit 328 determines the pointer coordinate position (X, Y) to be output, depending on, in addition to the input coordinate (x, y), the pointer coordinate position (X_pre, Y_pre) corresponding to a previous input.

Next, the operation recognition unit 318 attempts to obtain new input information that is not yet obtained, from the detection result series storage unit 314 (S218).

In the case of a failure in obtaining new input information, the operation recognition unit 318 attempts the obtainment again (No in S218).

On the other hand, when the operation recognition unit 318 is able to obtain some input information from the detection result series storage unit 314, the operation recognition unit 318 determines as which one of the events the input information can be recognized (Yes in S218, S220, S231, and S232).

Here, the events recognized by the operation recognition unit 318 include: the Release event, the Move event, the Select event, and the Gesture event.

The Release event is an event indicating that the user, once touches the input detection unit 210 with a finger, releases the finger from the input detection unit 210. The operation recognition unit 318 is capable of recognizing an occurrence of the Release event by determining whether or not the difference between adjacent times of input is greater than or equal to a specific value and whether or not the distance between adjacent input coordinates is greater than or equal to a specific value.

The Move event is an event indicating that the user, once touches the input detection unit 210 with a finger, moves the finger without releasing the finger. The operation recognition unit 318 is capable of recognizing an occurrence of the Move event, by obtaining coordinate information that includes a time of input within a given length of time from a time of input included in previous coordinate information and includes input coordinates within a given distance from the input coordinates included in the previous coordinate information.

The Select event is an event representing a completion of the selection operation by the user.

When the selection information obtained from the detection result series storage unit 314 is selection completion information, the operation recognition unit 318 recognizes an occurrence of the Select event.

The selection completion information is either the selection start time information or the selection finish time information. Which one of the selection start time information and the selection finish time information is to be selected for the selection completion information is previously determined depending on the coordinate determination apparatus 200.

This is because it depends on the application and the coordinate determination apparatus 200 whether the selection operation by the user is considered to be completed at the time when the user starts the selection or at the time when the user finishes the selection; therefore, either one of the selection start time information and the selection finish time information can be the selection completion information.

The Gesture event is an event that causes the display apparatus 100 to start specific calculator processing related to such a specific input, by performing a specific input such as a flicking operation, or drawing a circle or a square on the input detection unit 210.

As described above, the operation recognition unit 318 recognizes an occurrence of the Move event, when, for example, there is a significant difference between input coordinates at adjacent times. However, the operation recognition unit 318 can recognize the occurrence of the Gesture event only after obtaining a series of input information that continues for a given length of time.

First, the operation recognition unit 318 determines whether or not the input information obtained from the detection result series storage unit 314 can be recognized as the Release event (S220).

When the operation recognition unit 318 determines that the input information cannot be recognized as the Release event (No in S220), the display apparatus 100 performs the event processing corresponding to the type of the event (S219). The details thereof will be described later.

On the other hand, when the operation recognition unit 318 recognizes the input information as the Release event (Yes in S220), the coordinate mode selection unit 326 records the time of input (the time at which the user released the finger from the coordinate input device 201), which is included in the coordinate information that is the input information recognized as the Release event. Hereinafter, this time is represented by Tr.

Next, the operation recognition unit 318 determines whether or not the input information recognized as the Release event can be recognized as part of the Gesture event (S231). That is, the operation recognition unit 318 determines whether or not the series of coordinate information obtained by the operation recognition unit 318 from the obtain and store unit 204 can be recognized as the Gesture event.

More specifically, the operation recognition unit 318 determines whether or not it is possible to recognize, as the Gesture event, the first coordinate series that is a series of input coordinates from the contact start point 904 (the input coordinates indicated by the third coordinate information) to the move end point 906 (the input coordinate indicated by the first coordinate information) (S231).

This is because, as seen in the case of the flicking operation (a gesture operation of flicking with a finger) and so on, there is a type of gesture that cannot be determined and recognized as the flicking operation until the finger is released from the input detection unit 210. Thus, this requires the operation recognition unit 318 to determine, at the point when the user releases the finger from the input detection unit 210, whether or not the series of coordinate information input by the user is the Gesture event (S231).

Here, when the operation recognition unit 318 determines that the coordinate information recognized as the Release event is part of the Gesture event (that is, at the end of the series of the coordinate information recognized as the Gesture event) (Yes in S231), the display apparatus 100 performs processing corresponding to the Gesture event (S230).

For example, in the case of the flicking operation, the display apparatus 100 performs processing such as changing or controlling the screen display according to an operation direction of the flick gesture (such as flicking in a horizontal direction or in a vertical direction).

On the other hand, when the operation recognition unit 318 does not recognize the coordinate information as part of the Gesture event (No in S231), the coordinate mode selection unit 326 determines, using the time correlation specifying unit 320, whether or not the Select event has occurred within a specific permissible time (hereinafter, Wt) back from the time of occurrence Tr of the Release event (S232).

In other words, the time correlation specifying unit 320 calculates a difference between Ts that is a time of occurrence of the Select event (the time at which the selection operation is completed) and is stored in the coordinate mode selection unit 326 (FIG. 8, S412 that is to be described later) and Tr that is a time of occurrence of the Release event (the time at which the finger is released from the input detection unit 210), compares the difference with the specific permissible time Wt, and outputs, as a time correlation value, a result of the comparison to the coordinate mode selection unit 326.

According to the result of the comparison by the time correlation specifying unit 320, the coordinate mode selection unit 326 determines that "this Release event is a secondary event occurrence caused by the occurrence of the Select event" (Yes in S232), and proceeds to the processing corresponding to the Select event (S234).

In other words, the coordinate mode selection unit 326 does not select the coordinate mode, or does not change the coordinate mode.

For example, when the coordinate mode selection unit 326 determines that the release has occurred as a result of a selection operation of pressing the button, the display apparatus 100 performs display processing on the screen to indicate that pressing the button is completed, and also performs substantial processing and so on expected by the user as a result of pressing the button (S234).

On the other hand, when the difference between Tr and Ts is greater than the specific permissible time Wt (No in S232), the coordinate mode selection unit 326 starts processing for selecting the coordinate mode.

Here, for the description hereinafter, it is assumed that Wr is a length of time that has elapsed since the occurrence of the Release event (a length of time that has elapsed since the operation recognition unit 318 recognizes, as the Release event, the time of input included in the coordinate information).

The time correlation specifying unit 320 determines whether or not a length of specific time Wp has elapsed since the occurrence of the Release event up to the present, that is, determines whether or not Wr≤Wp is satisfied, and outputs the result to the coordinate mode selection unit 326 as the time correlation value (S240).

When the coordinate mode selection unit 326 obtains the time correlation value to find that the specific time Wp has not elapsed since the occurrence of the Release event, that is, when it is clarified that the Wr Wp is satisfied, the coordinate mode selection unit 326 determines whether or not it is possible to obtain new coordinate information from the detection result series storage unit 314 (S242).

When the coordinate mode selection unit 326 is unable to obtain new coordinate information (No in S242), the coordinate mode selection unit 326 displays, to the display unit 230, an image of the pointer 110 and the like indicating that Wp has not elapsed (S244). Subsequently, when Wr Wp is satisfied, the coordinate mode selection unit 326 returns to the processing for obtaining and determining new coordinate information (S242) (loops from S246 to S240).

In other words, the processing by the coordinate mode selection unit 326 is in a polling state (or a callback state), and the image display of the mouse pointer 110 and the like on the display apparatus 100 is continued until the new coordinate information is obtained or the specific time Wp has elapsed since the occurrence of the Release event (S244).

When unable to obtain the new coordinate information from the detection result series storage unit 314 within the specific time Wp, the coordinate mode selection unit 326 leaves the loop processing from S240 to S246, and finishes the display of the pointer 110 on the display unit 230 (S250).

After finishing the display of the pointer 110, the coordinate mode selection unit 326 determines, for a given length of time, whether or not it is possible to obtain new coordinate information from the detection result series storage unit 314 (S251).

Here, when the coordinate mode selection unit 326 obtains new coordinate information from the detection result series storage unit 314 (Yes in S251), the coordinate mode selection unit 326 performs the coordinate mode selection processing (S252).

As a result, when the coordinate mode selection unit 326 selects the absolute coordinate mode 130 as the coordinate mode ("absolute" in S252), the absolute coordinate mode 130 is selected as the coordinate mode (S254).

On the other hand, when the coordinate mode selection unit 326 selects the relative coordinate mode 132 ("relative" in S252), the relative coordinate mode 132 is selected as the coordinate mode (S256).

Subsequently, whichever mode may be set, the coordinate determination apparatus 200 resumes the processing from the beginning of Loop 1 (S214).

Note that the coordinate mode selection unit 326 can be considered to select the operation mode (S252) as shown earlier in FIG. 5.

In the processing, by setting a sufficiently large value for the specific time Wd, it becomes easier to shift to the relative coordinate mode 132 based on an initial pointer position ("relative" in S252) even after the display of the pointer 110 is finished (S250). Conversely, by setting a smaller value for Wd, it becomes easier to shift to the absolute coordinate mode 130 ("absolute" in S252) after the display of the pointer 110 is finished (S250). For the value of Wd, for example, a specific value that is previously determined can be used.

For example, when setting Wp to two seconds, the pointer 110 (for example, an image representing a finger shape) is displayed on the display unit 230 for two seconds after the user releases the finger from the input detection unit 210. When there is another input to the input detection unit 210 while this pointer 110 is being displayed, the coordinate determination apparatus 200 processes the input as an input in relative coordinates from the position of the pointer 110. On the other hand, the coordinate determination apparatus 200 processes, as an input in absolute coordinates, an input that is provided to the input detection unit 210 after disappearance of the display of the pointer 110. Such a coordinate determination apparatus in which the pointer display status and the coordinate input mode are associated with each other is not disclosed in the conventional techniques. In addition, in the conventional techniques, there is no disclosure of changing, even during operation in the relative coordinate mode, a correspondence relationship between the input detection unit 210 and the content displayed on the display unit 230 based on the operation time spent by the user, such as dealing with, as an input in absolute coordinates, any input from an input start point at which the input is provided after disappearance of the display of the pointer 110, nor do the techniques disclose the problem on which they are premised.

Next, when the coordinate mode selection unit 326 is unable to obtain new coordinate information from the detection result series storage unit 314 (No in S251), the coordinate mode selection unit 326 selects a coordinate mode as a default mode for the coordinate determination apparatus 200. For example, when the relative coordinate mode 132 is the default mode, the relative coordinate mode 132 is selected as the coordinate mode (S256). Subsequently, the coordinate determination apparatus 200 resumes the processing from the beginning of Loop 1 (S214).

Thus far, described above is the processing performed by the coordinate mode selection unit 326 when the coordinate mode selection unit 326 is unable to obtain the coordinate information from the detection result series storage unit 314 within a predetermined length of the specific time Wp (from S250 onwards).

Next, the following describes the processing performed by the coordinate mode selection unit 326 when the coordinate mode selection unit 326 is able to obtain the coordinate information from the detection result series storage unit 314 within the predetermined length of the specific time Wp (Yes in S242).

In this case, the coordinate mode selection unit 326 selects the coordinate mode using the obtained coordinate information (S280).

Note that the coordinate mode selection unit 326 can be considered to select the operation mode (S280) as shown earlier in FIG. 6.

As a result, when the coordinate mode selection unit 326 selects the absolute coordinate mode 130 ("absolute" in S280), the absolute coordinate mode 130 is selected as the coordinate mode (S282). In addition, when the coordinate mode selection unit 326 selects the relative coordinate mode 132 ("relative" in S280), the relative coordinate mode 132 is selected as the coordinate mode (S284).

Here, the coordinate determination apparatus 200, with the processing below, realizes processing that has never been achieved by the conventional techniques, in which a coordinate mode more usable for the user is automatically recognized during performance of a natural operation, so as to automatically switch the coordinate mode.

Specifically, the coordinate determination apparatus 200 calculates, as the time correlation value, Wr that is a difference between the time of occurrence of the Release event and the current time (S240), and outputs the time correlation value to the coordinate mode selection unit 326.

Here, in the case where Wr is less than or equal to Wp, when the coordinate mode selection unit 326 obtains new coordinate information, the coordinate correlation specifying unit 324 calculates a distance Rm between G_it(x, y) 510 and G_n(x, y) 512, and outputs, as the coordinate correlation value, the result of the comparison (size relationship) between the distance and one of Rr and Rb that is the specific threshold, to the coordinate mode selection unit 326.

The coordinate mode selection unit 326, based on the result of the comparison, automatically selects the absolute coordinate mode 130 as the coordinate mode when Rm is greater than the specific threshold, and conversely, automatically selects the relative coordinate mode 132 as the coordinate mode when Rm is smaller than the specific threshold (S280).

Lastly, whichever mode may be selected, the display apparatus 100 resumes the processing, starting with updating of the display coordinates according to the coordinate mode (S216).

Note that when the coordinate mode selection unit 326 selects the absolute coordinate mode 130 as the coordinate mode (S282), the coordinate mode selection unit 326 newly stores G_cur (x, y) 520 as G_it(x, y) 510 (S286).

Figure 8:
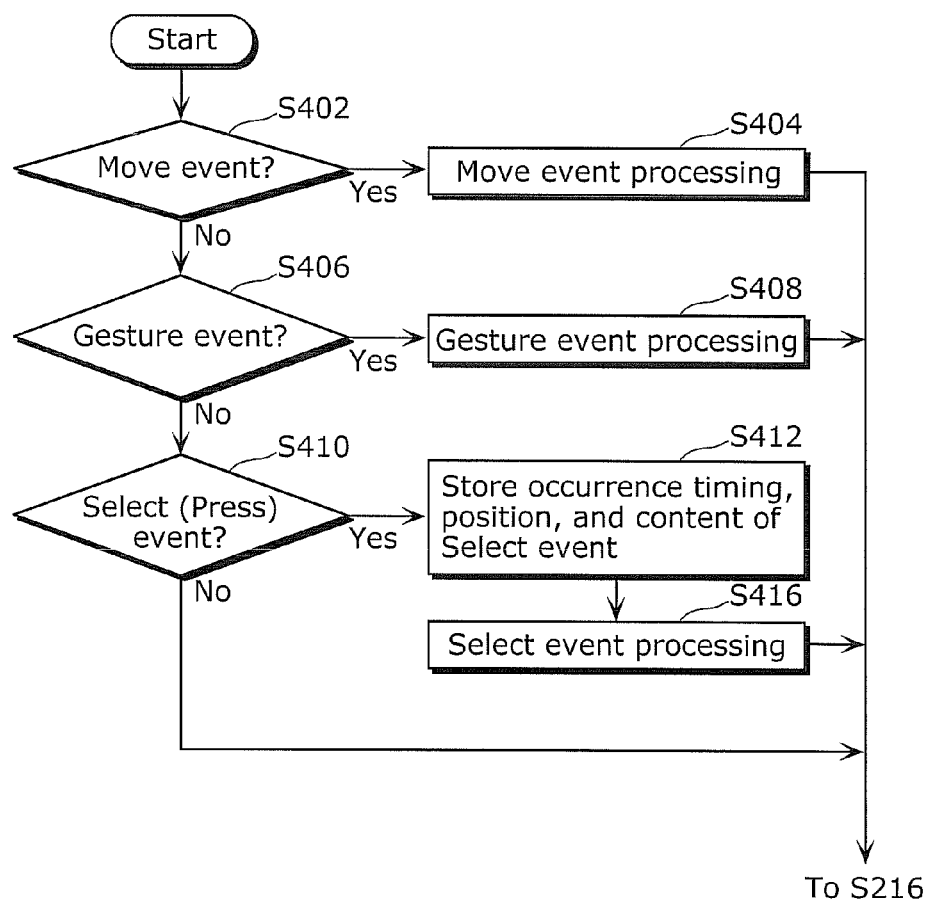
[FIG. 8]

FIG. 8 is a flowchart showing details of event processing other than the Release event processing, according the present embodiment.

In other words, FIG. 8 shows details of the processing (S219) according to the type of the event performed by the display apparatus 100, when the operation recognition unit 318 determines that the input information cannot be recognized as the Release event (No in S220).

First, when the operation recognition unit 318 determines that the input information is the Move event (Yes in S402), the display apparatus 100 performs processing according to the Move event (S404). Specifically, the display apparatus 100 updates the value of G_cur (x, y) 520 stored in the coordinate mode selection unit 326.

Subsequently, the coordinate transform unit 328 transforms G_cur (x, y) 520 into a corresponding pointer coordinate position on the display unit 230. Furthermore, the display unit 230 draws the pointer 110 (S216).

In addition, when the operation recognition unit 318 determines that the input information is the Gesture event (No in S402 and Yes in S406), the display apparatus 100 performs the processing according to the Gesture event (S408).

The gesture may be an arbitrary gesture, but in the case of a "rotating" operation, for example, the event is recognized as "Rotate gesture" when the operation recognition unit 318 recognizes an operation similar to "rotating" on the input detection unit 210. Subsequently, the display apparatus 100 performs processing corresponding to the "Rotate gesture". Specifically, for example, scrolling the screen display and the like can be considered.

In addition, when the operation recognition unit 318 determines that input information is the Select event (No in S406 and Yes in S410), the coordinate mode selection unit 326 records: the selection completion time (either the selection start time or the selection finish time) indicated by the selection completion information; the coordinates G_cur (x, y) 520 at the selection completion time; and the type of the icon and so on selected according to necessity (S412).

Furthermore, the display apparatus 100 performs processing related to the selection completion information (S416). Specifically, when the input detection unit 210 that is a clickable touchpad is pressed down on a specific icon, this corresponds to processing in which the display apparatus 100 draws a state of the button being yielded at the pointer 110 on the display unit 230.

This is the processing for the event other than the Release event (S219).

As described above, the coordinate input device according to the present embodiment allows dynamically selecting the operation mode according to the user operation, and thus allows seamlessly providing an operation mode that is easy to use for each user and for circumstances of the moment, without requiring explicit switching of the operation by the user.

Note that in the present embodiment, when the loop processing by the coordinate mode selection unit 326 (S240 to S246) is completed to the end, the coordinate mode selection unit 326 waits for another input (S251) and proceeds to the operation mode determination (S252).

However, after the pointer display is finished (S250), the coordinate determination apparatus 200 may return the processing to the beginning of Loop 1. In other words, the steps S251, S252, S254, and S256 may be omitted from the processing to be performed by the coordinate determination apparatus 200. In this case, the coordinate determination apparatus 200 executes the step S214 after the step S250.

Note that in the present embodiment, according to the length of time from the occurrence of the Release event (S220) to the next contact (input) (S242, S251), the coordinate mode selection unit 326 switches the content of the selection processing (S252, S280).

However, the coordinate mode selection unit 326 may perform the selection processing without switching the operation mode according to the time (S252). Specifically, the steps S240, S242, S244, S246, S280, S282, S284, and S286 may be omitted from the processing to be performed by the coordinate determination apparatus 200. In this case, when a predetermined condition is not satisfied in Step S232 (No in S232), the processing of S250 is performed next (the loop processing from S240 to S246 is not necessary).

Note that when, at the time of occurrence of an arbitrary event, it is intended to switch the coordinate mode selection processing that is to be performed by the coordinate mode selection unit 326 according to the length of time until the next contact (input), it is possible to omit the processing before the step S240 and apply the steps after the step S240 to an arbitrary input system.

Note that the coordinate mode selection processing by the coordinate mode selection unit 326 (S252 and S280) is not limited to the above. For example, the coordinate mode selection unit 326 may select the coordinate mode according to the arbitrary data that can be obtained by the coordinate determination apparatus 200, such as an instrument, a device, and so on.

Note that the coordinate determination apparatus 200 can arbitrarily determine a default coordinate mode. For example, the coordinate determination apparatus 200 may dynamically determine the coordinate mode artificially or based on records and details of usage so far, or the coordinate determination apparatus 200 may obtain a coordinate mode as the default mode, from a ROM and the like.

Note that what type of event is to be selected by the operation recognition unit 318 (S218, S220, S231) depends on the system configuration or application configuration, and is not necessarily limited to the three events described above.

In the present embodiment, "Move" has been described as a pointing function, "Gesture" as a general function to recognize an operation, and "Select" as a function to transmit an intention such as determination.

However, the input information to be processed by the coordinate determination apparatus 200 is not limited to these three events, and can include an overall event "including information that can be obtained from a generally available input detection unit 210, recognition result information that can be obtained using a combination of generally available recognition techniques, and so on".

Note that the Move event processing (S404) performed by the display apparatus 100 includes not only updating of pointer coordinates inside but also arbitrary processing that is generally performed when moving the pointer in a personal computer, an embedded device, and so on.

Such processing includes, for example, hit-box processing and display of the pointer on GUI components, but is not limited to this.

Note that Gesture event processing (S408) performed by the display apparatus 100 includes not only rotation but also arbitrary processing using a general gesture recognition technique. For example, such processing includes screen scroll processing by slide operation or screen enlargement processing through pinch out operation, but is not limited to these.

Note that the Select event processing (S412) performed by the display apparatus 100 may be triggered by an arbitrary Select event that occurs according to a selection operation method using a general input detection unit 210.

For example, when the input detection unit 210 is a touchpad, an input switch mechanism may be provided in a lower portion of the touchpad to cause the entire touch pad to function as the clickable touchpad, and the Select operation may be trigged by pressing this touchpad like a physical switch (button). Note that the Select operation is not limited to these.

Note that the Gesture event processing (S408) performed by the display apparatus 100 is not limited to the flicking operation described earlier, but may be a gesture operation that involves arbitrary release.

Note that the operation performed by the display apparatus 100 according to the Select event (S234) is not limited to an example of button display but may be arbitrary processing or display in a general Select event in a personal computer or a general device.

Note that Loop 2 (S240, S242, S244, S246) waiting for an input by the coordinate mode selection unit 326 is not necessarily loop processing, but the equivalent function may be realized using an arbitrary programming technique and system configuration. This is also applicable to Loop 1 and input wait (S218, S251).

Note that the pointer display termination processing (S250) after the loop processing for input wait may involve not only stopping (deleting) the display from S246 immediately after termination of the loop in S246, but also gradually making the display lighter or causing the display to blink, or displaying an animation effect, a tooltip, a comment, or the like that indicates that "time is running out".

Note that during the loop processing for input wait (S240, S242, S244, S246), the coordinate mode selection unit 326 may, as described above, gradually make the display lighter or cause the display to blink, or may display, on the display unit 230, an animation effect, a tooltip, a comment, or the like that indicates that "time is running out". Furthermore, the attention and understanding of the user may be drawn and prompted by changing these expressions with time.

Note that the selection as to whether or not the Select event has occurred within the specific permissible time Wt (S232), which is performed by the coordinate mode selection unit 326, may be performed not only for the Select event but also for any one of the arbitrary events described above.

However, in the case of the coordinate mode selection unit 326 using the same type of event as the event detected by the operation recognition unit 318 as descried above, a criterion for determining whether or not the Select event has occurred "within the specific permissible time Wt" may be set to a point in time when a corresponding previous event occurred. Specifically, when the coordinate mode selection unit 326 obtains an occurrence of an nth event, the coordinate mode selection unit 326 compares the specific permissible time Wt and the length of time that has elapsed since the occurrence of the n−1 event of the same type (S232).

Note that the coordinate mode selection unit 326 may obtain at least one of (i) a result of the comparison by the coordinate correlation specifying unit 324, (ii) a result of the comparison by the time correlation specifying unit 320, (iii) a result of the estimation of the grip status by the grip estimation unit 316, and (iv) a result of recognizing the user operation by the operation recognition unit 318, and determine the coordinate mode based on the obtained result.

[Variation]

The following describes a variation of the present embodiment.

In the embodiment above, Wt, Wp, Wd, Rr, and Rb have been described as predetermined values, but in this variation, Wt, Wp, Wd, Rr, and Rb are dynamically changed according to the "degree of operation" by the user.

Not that the specific example of the degree of operation can be considered to be the number of operations per unit time, an operation period of the coordinate determination apparatus 200, and records of usage per coordinate mode, but is not limited to these.

Figure 9:
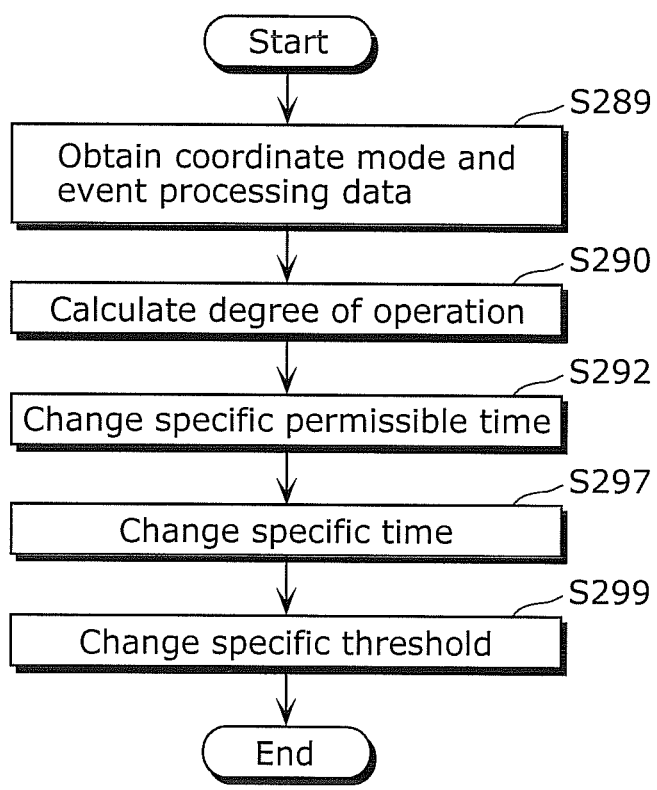
[FIG. 9]

FIG. 9 is a flowchart showing processing for changing a threshold and so on according to the degree of operation, in the first variation of the present embodiment.

Note that the coordinate mode selection unit 326 obtains the usage records of each coordinate mode previously determined by the coordinate mode selection unit 326 (S289). In other words, the coordinate mode selection unit 326 obtains usage records in the absolute coordinate mode 130 and the relative coordinate mode 132. For the obtaining method, for example, it is possible to obtain records later, by causing the coordinate mode selection unit 326 to record, beforehand, the coordinate mode previously notified to the coordinate transform unit 328, onto a RAM, a hard disk, a flash memory, or the like.

The coordinate mode selection unit 326 may also obtain the record of event processing data (S289). For example, the event processing data can be: a type, a time of occurrence, a finish time, and so on of each of the Move event, the Gesture event, and the Select event that has occurred.

It is possible to obtain the records of these events by causing the coordinate mode selection unit 326 to obtain the result of the recognition processing by the operation recognition unit 318 and record the obtained result onto a RAM, a hard disk, a flash memory, or the like.

Next, the coordinate mode selection unit 326 calculates the degree of operation based on the obtained coordinate mode and event processing data (S290).

For example, the coordinate mode selection unit 326 calculates: the number of occurrences per unit time of an event that is recognized by the operation recognition unit 318 as one of the Move event, the Gesture event, and the Select event; an average input time per occurrence of each of the Move event, the Gesture event, and the Select event, and so on.

More specifically, it is possible to assume that the coordinate mode selection unit 326 calculates a plurality of differences between the time at which the user completes the selection and the time at which the Release event occurs, and calculates a reciprocal of the average of the differences as the degree of operation.

In addition, the degree of operation is not limited to these and may be another feature quantity that characterizes the input operation performed by the user on the input detection unit 210.

Next, the coordinate mode selection unit 326 revises the value of the specific permissible time Wt, based on the calculated degree of operation (S292).

For example, the coordinate mode selection unit 326 sets a smaller value for Wt when: the calculated degree of operation is higher than before, and the coordinate mode selection unit 326 determines that the use is becoming more familiar with the operation of the coordinate determination apparatus 200.

In addition, when the degree of operation that is a period of time for which the coordinate determination apparatus 200 performs the operation is higher than before, the coordinate mode selection unit 326 may set the specific permissible time Wt shorter, based on the determination that the user is more familiar with the current coordinate mode (S232).

This allows improving a problem that the coordinate mode selection unit 326 determines not to change the coordinate mode (Yes in S232) despite the user's intention to change the coordinate mode (No in S232).

Next, the coordinate mode selection unit 326 revises the values of the specific lengths of time Wp and Wd, based on the calculated degree of operation (S294 and S297).

For example, the coordinate mode selection unit 326 sets smaller values for Wp and Wd, when determining that the degree of operation that is operation frequency is higher than before due to a larger number of occurrences of the Move event per unit time. This allows improving the tendency that the coordinate mode is recognized as the relative coordinate mode 132 despite the user's expectation that the coordinate mode would be recognized as the absolute coordinate mode 130.

Lastly, the coordinate mode selection unit 326 revises the values of the specific thresholds Rr and Rb, based on the calculated degree of operation (S299).

For example, since input coordinates corresponding to the beginning of the Move event are constantly within a given range, the coordinate mode selection unit 326 sets smaller values for Rr and Rb, when determining that the degree of operation that is a reciprocal of unevenness at the contact start point is higher than before. This allows improving the tendency that the coordinate mode is recognized as the relative coordinate mode 132 despite the user's expectation that the coordinate mode would be recognized as the absolute coordinate mode 130.

Note that in the present embodiment, the method of correcting such parameters as Wt, Wp, Wd, Rr, and Rb, based on the degree of operation may be changed according to an intended use of the coordinate input system 90.

For example, a number of Select events serially occur in the context of using a virtual keyboard that is a keyboard displayed on the display unit 230 or shooting game.

Therefore, setting Wt shorter facilitates detecting, in a shorter time, a holding operation that is purposefully performed by the user during a length of time from completion of the Select operation to Release, thus producing an advantageous effect of allowing the user to perform quick input.

This is applicable to the other parameters such as Wp, Wd, Rr, and Rb.

For example, the coordinate mode selection unit 326 may determine the degree of operation, based on the record of the coordinate mode, the continuation time of the currently determined mode, or a length of time spent on the operation, and may change the parameter such as Wd, Rr, and Rb. Specifically, it is possible to consider that the coordinate mode selection unit 326 revises the parameter such as Wd, Rr, and Rb such that the longer the current coordinate mode continues without change, the less likely the coordinate mode is to be changed.

On the other hand, it is also possible to assume the case where, depending on the application, the higher the degree of operation, that is, the more familiar the user is with performing input using the coordinate determination apparatus 200, the longer parameter is set by the coordinate mode selection unit 326.

For example, in a photo viewer application for thumbnailing a list of photographs, it is assumed that the coordinate determination apparatus 200 provides an operation method unique to the application, which allows selecting, after selecting a first photograph, second and third photographs by moving the finger on the input detection unit 210.

In this case, by setting Wt longer based on a determination that a user more familiar with the coordinate determination apparatus 200 is inclined to perform a unique operation, it becomes easier for the user to select a number of photographs at the same time, so that the user enjoys usability.

Note that the coordinate mode selection unit 326 may calculate a plurality of degrees of operation.

Specifically, operation degree information as time-series information may be held, or the degree of operation may be calculated for each event.

In addition, the coordinate mode selection unit 326 may separately or integrally set the degree of operation, for more than one constituent element and information item that can be recognized by the system, such as: by the user, by the time of day, by the day of the week, by the application, and so on regarding the use. In this case, the term "integrally" means a combination of constituent elements described earlier, for example, "the degree of operation in Application A on Tuesday" or "an occurrence frequency of the Select event in Application B for a user A".

In addition, the specific time, the specific threshold, and the like may be modified not according to the degree of operation but according to the coordinate mode. Specifically, the specific time, the specific threshold, or the like may be set longer (or shorter) when operating in the relative coordinate mode 132, and the specific time, the specific threshold, or the like may be set shorter (or longer) when operating in the absolute coordinate mode 130.

In addition, the predetermined time Wt, Wp, Wd, and the like may be set according to: a distribution of occurrence time lengths, an average length of occurrence time, a longest time, or a shortest time of an event such as the Select event, in each coordinate mode.

In addition, the coordinate mode selection unit 326 may revise the value of each parameter such as Wt, Wp, Wd, Rr, and Rb, based on the degree of operation and the revision method that is different between each parameter.

In addition, the degree of operation calculated by the coordinate mode selection unit 326 may be determined not simply by "the number of operations within a unit time" but also by "the coordinate mode, the pointer position, a distribution of the position at the time of occurrence of the event", and so on.

Furthermore, the coordinate mode selection unit 326 may calculate the degree of operation by: "contact positions of an input sensor and the distribution of such positions", "setting a degree of operation unique to the user by user estimation through matching with previous usage", "change in the operation status before and after the predetermined time or the judgment condition is changed", "arbitrary combination of internal data that can be obtained by the system and dynamically obtainable information", and so on.

In this case, the detection result series storage unit 314 may hold all the information necessary for the coordinate mode selection unit 326 to calculate the degree of operation, which is information such as: coordinates and so on detected by the input detection unit 210 and a time of the detection; a type of the event recognized by the operation recognition unit 318 and the time of occurrence of the event; a result of the coordinate mode selection by the coordinate mode selection unit 326 and a time of the selection; and an ID and so on for identifying the operating user and the date of the operation.

In addition, when the coordinate mode selection unit 326 revises the specific time Wp that is a condition for terminating the loop processing for input wait (S240, S242, S244, S246), the coordinate mode selection unit 326 may change a pointer deleting effect, according to an absolute value thereof (whether the predetermined time is short or long) or a relative value thereof (whether the predetermined time is shorter or longer than the previous condition).

Furthermore, the coordinate mode selection unit 326 may display a state of increase or decrease of Wp itself, by animation effect, tooltip, comment, and so on.

Note that the coordinate mode selection unit 326 may revise the parameter such as Wt, Wp, Wd, Rr, and Rb, according to the level of operation proficiency in each coordinate mode.

The operation proficiency is a type of the degree of operation, and is determined according to the occurrence frequency of an event (such as the number of Select events), the number of errors, total time of use, and so on in each coordinate mode.

In addition, the coordinate mode may be selected according to different levels of operation proficiency.

As described above, according to the first variation of the present embodiment, the "degree of operation" which is associated with each user's familiarity with the operation, habit, intended use is calculated, and it is possible to change, using this calculated degree of operation, the thresholds for the time and distance, and so on (Wt, Wp, Wd, Rr, and Rb) that are to be used by the coordinate mode selection unit 326.

This allows the coordinate determination apparatus 200 to provide a more detailed response to an input operation natural for each user, and thus allows realizing automatically recognizing and switching the coordinate mode to a coordinate mode more usable for the user.

More specifically, for the user determined by the system as being familiar with the input operation in the absolute coordinate mode, such processing may be performed as decreasing the possibility of shifting to the relative coordinate mode by reducing the length of display time (Wp described above) of the pointer 110, or determining the coordinate mode to be the absolute coordinate mode even if the finger is still on the coordinate input device 201. In addition, as in the case of typing in general keyboard input, the coordinate mode may be determined as the absolute coordinate mode even if, for example, the distance between each input point is shorter than the threshold. Note that none of the conventional techniques disclose such processing and the problem on which the processing is premised.

[Variation 2]

Hereinafter, a second variation of the present embodiment will be described.

In the embodiment described above, the coordinate mode selection unit 326 has used, as the distance for selecting the coordinate mode, G_it(x, y) 510 that is a set of input coordinates indicated by the third coordinate information and G_n (x, y) 512 that is a set of input coordinates shown by the second coordinate information, but the coordinate mode selection unit in the present variation uses different distances.

Figure 10:
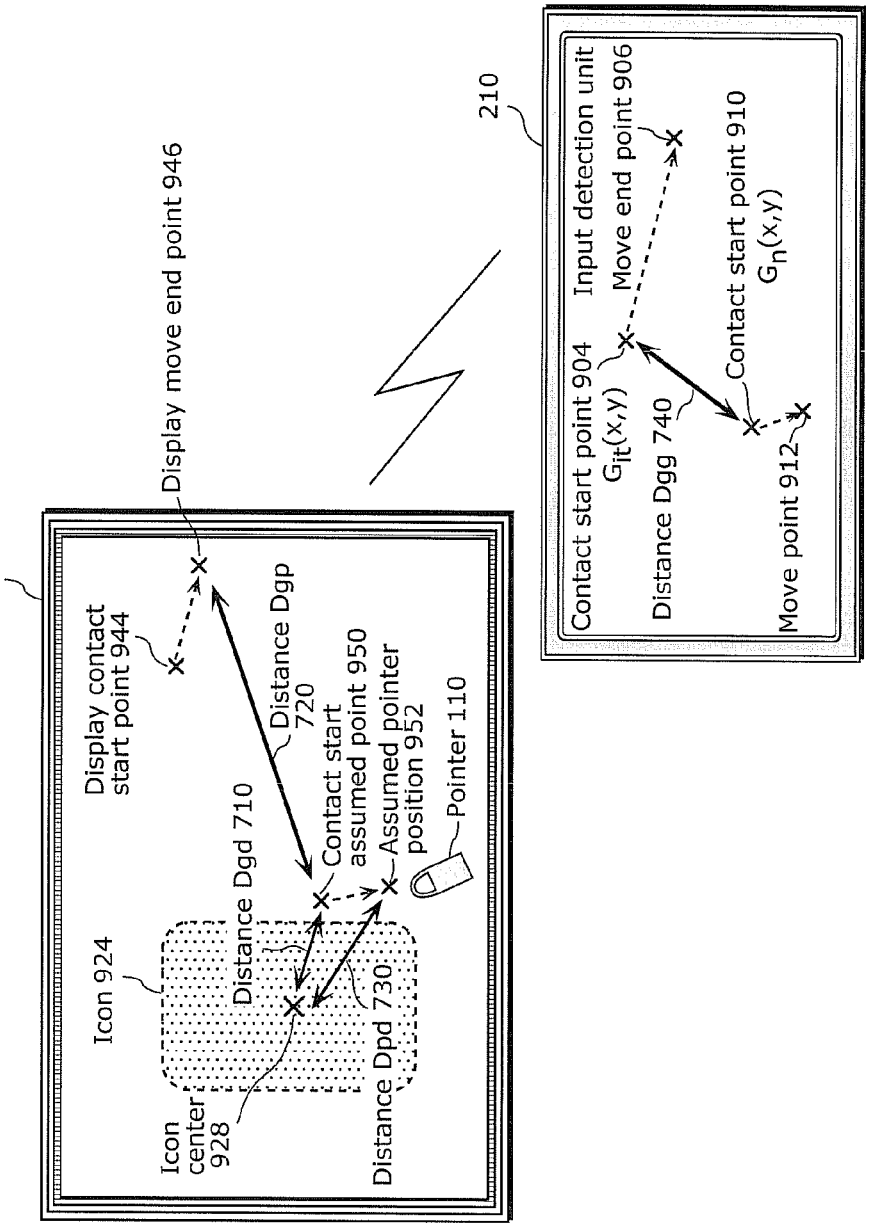
[FIG. 10]

The following gives a specific description with reference to FIG. 10.

FIG. 10 is a schematic diagram showing an example of the distance used by the coordinate mode selection unit 326 for determining the coordinate mode, in the second variation of the present embodiment.

At this time, it is assumed that the user touches the contact start point 904 that is a point on the input detection unit 210 of the touchpad type. Subsequently, the user moves the finger without releasing the finger from the input detection unit 210, and releases the finger at the move end point 906.

Subsequently, it is assumed that the user starts contact again from the contact start point 910, and moves the finger up to the move point 912.

At this time, G_it(x, y) 510 corresponds to the contact start point 904. In addition, G_n(x, y) 512 corresponds to the contact start point 910. In addition, the distance between the contact start point 904 and the contact start point 910 is assumed as a distance Dgg 740.

In addition, when moving the finger from the contact start point 904 to the contact end point 906, the display unit 230 is assumed to display the pointer 110 corresponding the movement from the display contact start point 944 to the display move end point 946.

Furthermore, a display position of the contact start point 910, when interpreted as the absolute coordinate mode 130, is assumed as a contact start assumed point 950. In addition, it is assumed that when the user moves the finger up to the move point 912 as described earlier, a display position of the move point 912 when interpreted as the absolute coordinate mode 130 is an assumed pointer position 952.

Furthermore, an icon 924 is assumed as an icon currently being displayed on the display unit 230, and an icon center 928 is assumed as coordinates of a center of the icon 924.

Here, a distance Dgp 720 is assumed as a distance between the display move end point 946 and the contact start assumed point 950.

In addition, a distance Dgd 710 is assumed as a distance between the icon center 928 and the contact start assumed point 950.

In addition, a distance Dpd 730 is assumed as a distance between the assumed pointer position 952 and the icon center 928.

The coordinate mode selection unit 326 can select the coordinate mode, using a conditional expression defined by an arbitrary combination of these distances.

For example, the coordinate mode selection unit 326 can be considered to select the absolute coordinate mode 130 as the coordinate mode when: the distance Dgg 740 is greater than or equal to a predetermined value; the distance Dgd 710 is less than or equal to the predetermined value; and the distance Dgp 720 is greater than or equal to the predetermined value.

In addition, it is possible to consider that the coordinate mode selection unit 326 selects the relative coordinate mode 132 as the coordinate mode when: the distance Dgg 740 is greater than or equal to the predetermined value; the distance Dgd 710 is less than or equal to the predetermined value; the distance Dgp 720 is greater than or equal to the predetermined value; and the distance Dpd 730 is less than or equal to the predetermined value.

Note that a screen display part that is to be compared in distance from the pointer 110 is not limited to the closest screen display part. The coordinate mode selection unit 326, when selecting the coordinate mode, can integrally use the distance between the pointer 110 and an arbitrary part, and a plurality of distances between the pointer 110 and a plurality of parts.

In addition, the coordinate mode selection unit 326 may select the coordinate mode according to the information indicating that the pointer 110 is (is not) on the screen display part.

Note that in the description above, the assumed pointer position 952 has been defined as a display position of the pointer 110 on the display unit 230 in the absolute coordinate mode 130, but the assumed pointer position 952 may also be considered to be an actual display position of the pointer 110 in the absolute coordinate mode 130 or in the relative coordinate mode 132.

Note that for the shape of the pointer 110 displayed on the display unit 230, the display apparatus 100 may display an image having an arbitrary shape such as a finger shape, other than a general cursor shape.

Note that in the description above, the distance Dgd 710 has been described as the distance between the icon center 928 and the contact start assumed point 950; however, the distance Dgd 710 may also be calculated not only with reference to the icon center 928, but also using at least one piece of distance information indicating a distance to an arbitrary position in the screen display part.

In addition, the number of screen display parts used by the coordinate mode selection unit 326 for calculating the distance information is not limited to one. The coordinate mode selection unit 326 may calculate distances between a plurality of screen display parts, and may further use an average of the distances and so on.

Note that when the coordinate mode selection unit 326 selects the coordinate mode (S252) after the end of display of a wait pointer, the method used by the coordinate mode selection unit 326 for determining the coordinate mode (S280) before the end of display of the wait pointer may be used partially, by combining parts thereof, or as it is.

In addition, the coordinate mode selection unit 326 may select the coordinate mode according to the distance between G_n(x, y) 512 and the screen display (GUI).

In addition, the coordinate mode selection unit 326 may select the coordinate mode according to the current (or previous) position of the pointer (or record) on the screen.

In addition, the coordinate mode selection unit 326 may select the coordinate mode according to a mutual distance between each of the three points: G_n(x, y) 512, a screen display (GUI) position, and G_cur (x, y) 520.

Furthermore, the coordinate mode selection unit 326 may select the coordinate mode according to the mutual distance between each of four points including G_it(x, y) 510 in addition to the three points described above.

Note that the coordinate mode selection unit 326 may select the coordinate mode, using not only G_it(x, y) 510 but also arbitrary coordinate information included in the first coordinate series (for example, coordinate information corresponding to an end of the first coordinate series or corresponding to a point located between the beginning and the end of the first coordinate series).

Specifically, while the user is operating the pointer 110 in the relative coordinate mode 132, it is assumed that the pointer 110 has passed near a portion corresponding to a specific GUI part (such as a button) in the absolute coordinate mode 130. At this time, the coordinate mode selection unit 326 is able to display the pointer on the specific GUI part by selecting the absolute coordinate mode 130 as the coordinate mode (S280).

Furthermore, when the distance between the position of the specific GUI part and the position of the pointer 110 on the screen is less than or equal to the specific distance, the coordinate mode selection unit 326 may select, by giving priority over the other conditions, the absolute coordinate mode 130 as the coordinate mode.

Note that the coordinate mode selection unit 326 may select the coordinate mode for each of the four positions G_it(x, y) 510, G_n(x, y) 512, the screen display (GUI) position, and the current position of the pointer 110 on the display unit 230, according to the mutual distance between each of the four positions.

In addition, the coordinate mode selection unit 326 may select the coordinate mode by combining a plurality of mutual distances or by weighting the distances.

Note that as with the coordinate input device 201 of a remote-control type with a touchpad, the coordinate input device 201 may include a plurality of input detection units 210 (for example, touchpads).

In this context, the obtain and store unit 204 stores all the inputs from the input detection units 210, into the detection result series storage unit 314.

Note that the coordinate mode selection unit 326 may reset the coordinate mode to the default mode as a result of the change in the input detection unit 210 (touchpad) used for input.

In addition, the coordinate mode selection unit 326 may select the coordinate mode according to a result of the estimation (for example, how the user holds the coordinate input device 201, such as holding by the right hand, by the left hand, or by both hands) performed by the grip estimation unit 316.

For example, the coordinate mode selection unit 326 may increase or decrease, according to the grip status estimated by the grip estimation unit 316, at least one of: the specific permissible time Wt, the specific times Wp and Wd, and the specific thresholds Rr and Rb.

More specifically, as shown in FIG. 1, it is assumed that the user grips the coordinate input device 201 with the right hand and operates the input detection unit 210 using a thumb.

In this context, as a position to touch with the thumb, of the left and right sides of the input detection unit 210 (touchpad), the user is able to perform operations more easily on the left side. This is because the grip status becomes unstable when the user touches the right side of the input detection unit 210 with the thumb while gripping the input detection unit 210 with the right hand.

Thus, when the user touches the right side of the input detection unit 210 at G_it(x, y) 510, it is possible to consider reducing the values of the specific permissible time Wt, the specific times Wp and Wd, and the specific thresholds Rr and Rb so that the absolute coordinate mode is more likely to be selected, based on an estimation that the operation has a specific meaning intended by such purposeful performance of the difficult operation In addition, the coordinate mode selection unit 326 may reset the coordinate mode to the default mode (one of the absolute coordinate mode 130 and relative coordinate mode 132) when the holding state of the user is changed. In addition, the coordinate mode selection unit 326 may return the coordinate mode to the default mode once the user takes the hands off the coordinate input device 201.

In addition, the coordinate mode selection unit 326 may change the default mode itself between when the user holds the coordinate input device 201 with both hands and when the user holds the coordinate input device 201 with one hand.

In addition, the coordinate mode selection unit 326 may change the default coordinate mode between when the user holds the coordinate input device 201 with the right hand, and when the user holds the coordinate input device 201 with the left hand.

In addition, the coordinate mode selection unit 326 may change the default coordinate mode according to the user's dominant hand.

In addition, the coordinate mode selection unit 326 may select the coordinate mode not only according to these techniques but also using another technique.

Lastly, the following describes a third variation of the present embodiment.

In the embodiments above, it is not possible to change the default coordinate mode. However, in the present variation, it is possible to change the default coordinate mode according to, for example, a preference and intended use of the user.

Figure 11:
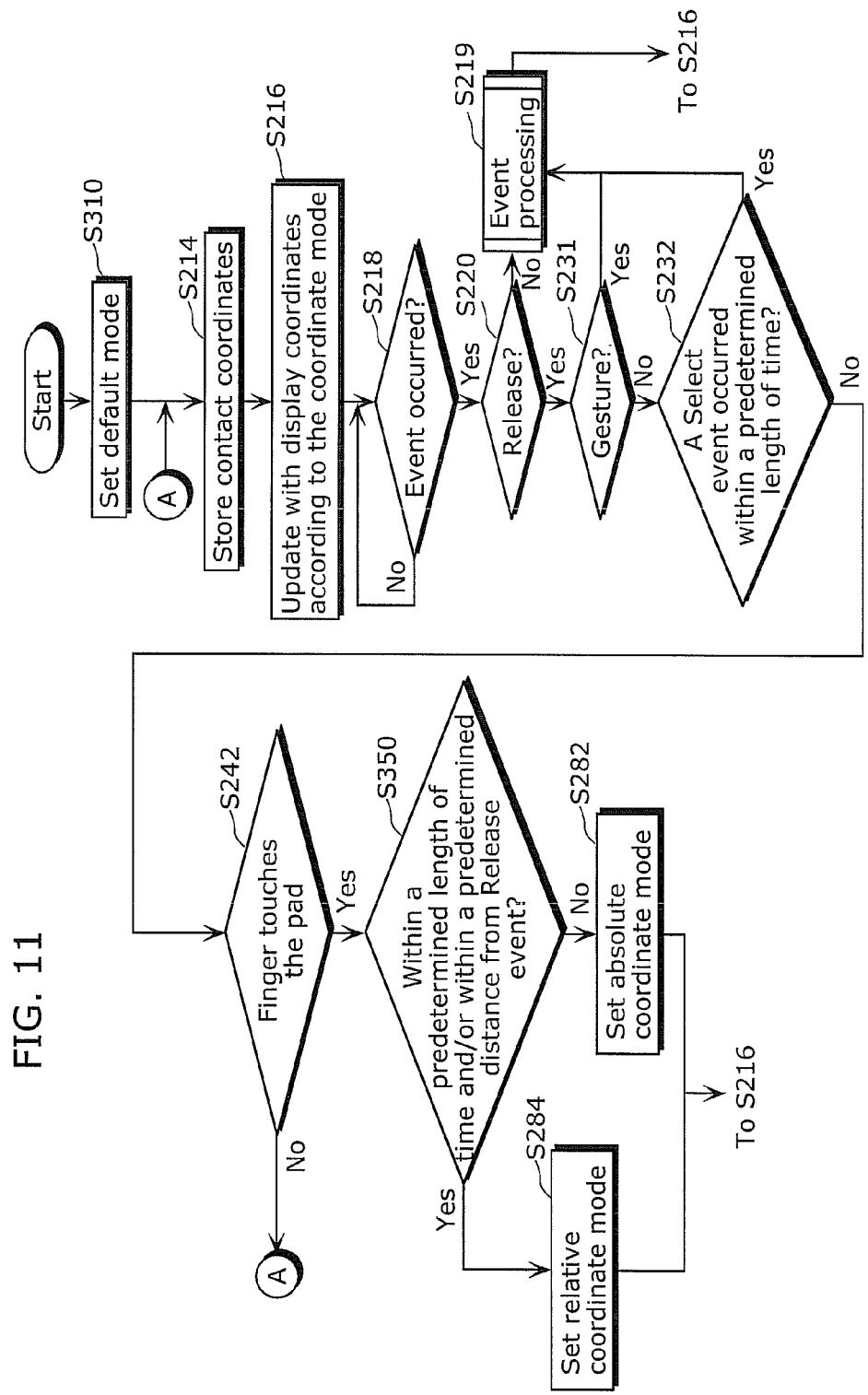
[FIG. 11]

FIG. 11 is a flowchart showing processing performed by the coordinate determination apparatus 200, in the third variation of the present embodiment.

Note that the same constituent element as that in FIG. 7 is assigned with the same reference sign, and the description thereof is omitted.

In the third variation, the coordinate determination apparatus 200 first sets the default coordinate mode to either the absolute coordinate mode 130 or the relative coordinate mode 132 (S310).

The method of setting the default mode can be considered to include, for example: a method in which the coordinate mode selection unit 326 displays a GUI screen on the display unit 230, and the coordinate determination apparatus 200 performs setting by obtaining the result of the selection performed by the user using the coordinate input device 201; and a method in which the coordinate mode selection unit 326 determines the default coordinate mode from the previous operation records.

Subsequently, after the operation recognition unit 318 recognizes the Release event, when the coordinate mode selection unit 326 obtains the coordinate information that is input again by the user (Yes in S242), the coordinate mode selection unit 326 performs the coordinate mode selection processing (S350).

For example, with reference to FIG. 3, when the time of input of the contact start point 910 is within a given length of time from the time of input of the move end point 906 (Yes in S350), the processing shifts to the relative coordinate mode 132 (S284).

Alternatively, the distance between the input coordinates of the contact start point 910 and the input coordinates of the contact start point 904 is within a given distance (Yes in S350), the processing shifts to the relative coordinate mode 132 (S284).

In other cases, the processing shifts to the absolute coordinate mode 130 (S282).

Note that the coordinate mode selection processing (S350) performed by the coordinate mode selection unit 326 is not limited to the above.

For example, the coordinate mode selection unit 326 may select the relative coordinate mode 132 as the coordinate mode when the time of input of the contact start point 910 is within a given length of time from the time of input of the move end point 906 and when the distance between the input coordinates of the contact start point 910 and the input coordinates of the contact start point 904 is within in the given range of distance, and may select the absolute coordinate mode 130 in other cases.

Furthermore, the coordinate mode selection unit 326 may select the coordinate mode, using the determination processing (S232, S252, and S280) and so on used for the other variation described earlier, so as to select the coordinate mode.

Figure 12:
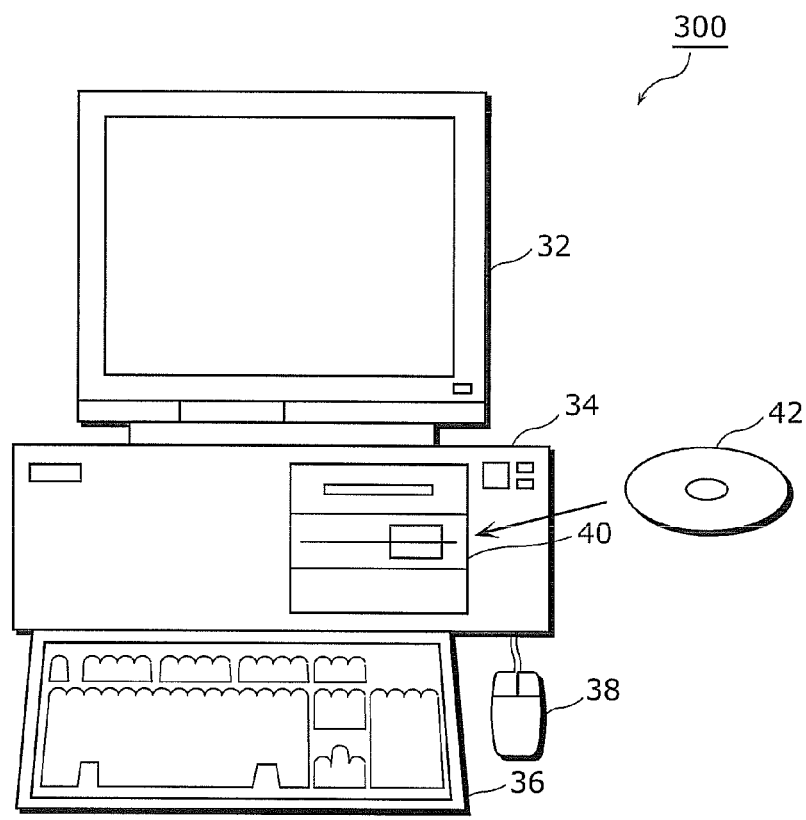
[FIG. 12]

In addition, it is possible to realize the coordinate determination apparatus 200 described in the present embodiment, using a computer. With reference to FIG. 12, the coordinate determination apparatus 200 includes: a computer 34, a keyboard 36 and a mouse 38 with which to provide an instruction to the computer 34; a display 32 for presenting information such as a result of the calculation by the computer 34; and a compact disc-read only memory (CD-ROM) apparatus 40 for reading the program to be executed by the computer 34 and a communication modem (not shown).

The program for realizing each processing performed by the coordinate determination apparatus 200 is stored on the CD-ROM 42 that is a computer-readable medium, and is read by the CD-ROM apparatus 40. Alternatively, the program is read by the communication modem through a computer network 26.

Figure 13:
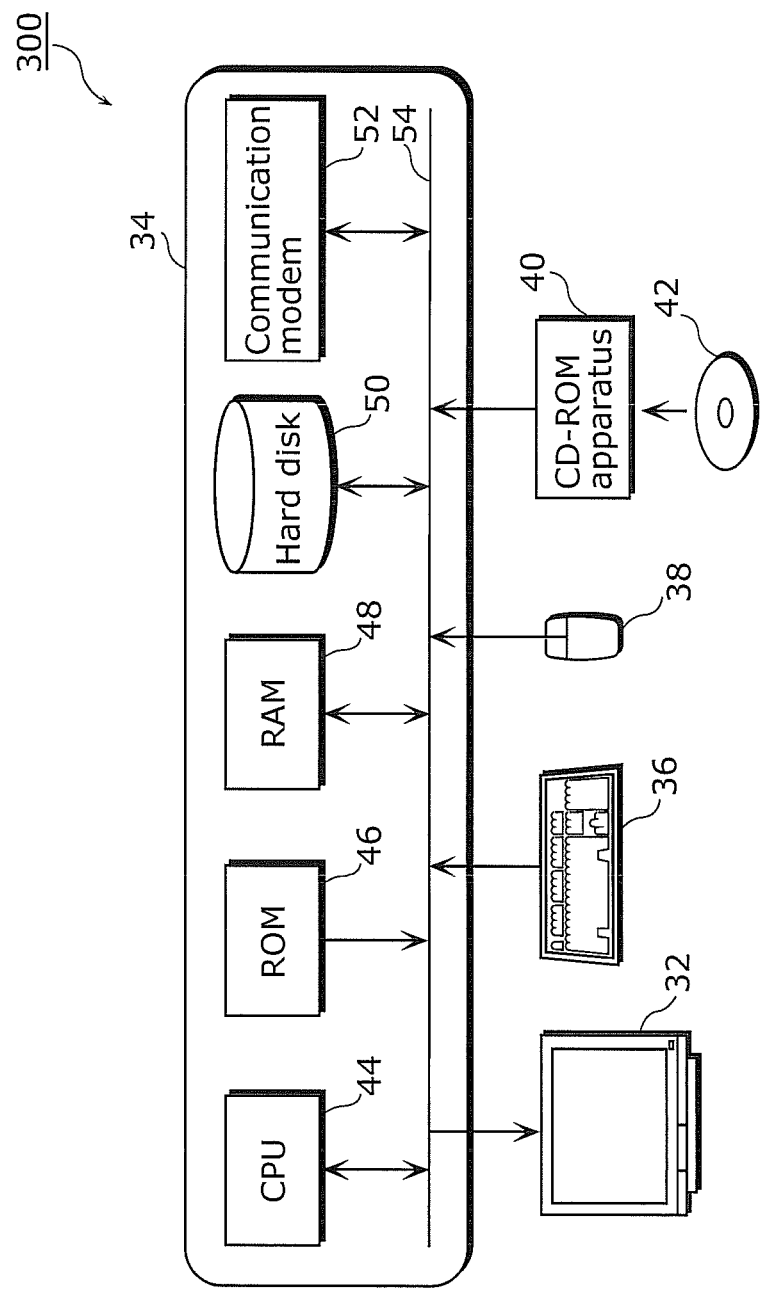
[FIG. 13]

FIG. 13 is a block diagram showing a hardware configuration of the computer system that realizes the coordinate determination apparatus 200. The computer 34 includes: a CPU 44, a ROM 46, a RAM 48, a hard disk 50, a communication modem 52, and a bus 54.

The CPU 44 executes the program read via the CD-ROM apparatus 40 or the communication modem 52. The ROM 46 stores the program and data necessary for operating the computer 34. The RAM 48 stores the data such as a parameter for executing the program. The hard disk 50 stores the program and data. The communication modem 52 performs communication with another computer via the computer network 26. The bus 54 connects, mutually, the CPU 44, the ROM 46, the RAM 48, the hard disk 50, the communication modem 52, the display 32, the keyboard 36, the mouse 38, and the CD-ROM apparatus 40.

Furthermore, part or all of the constituent elements of each of the devices described above may be configured with one system large scale integration (LSI). The system LSI is a super multifunctional LSI manufactured by integrating a plurality of components on a single chip, and is specifically a computer system configured including a microprocessor, a ROM, a RAM, and so on. The RAM holds the computer program. The system LSI performs its function, with the microprocessor operating according to the computer program.

Furthermore, part or all of the constituent elements of each of the devices described above may include an IC card or single module that is detachable from and attachable to each device. The IC card or module is a computer system configured with a microprocessor, a ROM, a RAM, and so on. The IC card or module may include the super multifunctional LSI described above. The IC card or module performs its function, with the microprocessor operating according to the computer program. This IC card or module may have tamper resistance.

In addition, the present invention may be realized as the methods described above. In addition, these methods may be a computer program executing these methods through a computer, or may be a digital signal representing the computer program.

Furthermore, the present invention may be realized by recording the computer program or digital signal on a computer-readable recording medium that is, for example, a flexible disk, a hard disk, a CD-ROM, a magnetooptic disc (MO), a Digital Versatile Disc (DVD), a Digital Versatile Disc Read Only Memory (DVD-ROM), a Digital Versatile Disc Random Access Memory (DVD-RAM), a Blu-ray disc (BD) (registered trademark), a universal serial bus (USB) memory, a memory card such as a secure digital (SD) card, a semiconductor memory, and so on. In addition, the present embodiment may be realized as the digital signal recorded on these recording media.

In addition, the present invention may be realized as the computer program or digital signal transmitted via a telecommunications line, a wireless or wired communication line, a network represented by the Internet, data broadcasting and so on.

In addition, the present invention may be realized as a computer system including a microprocessor and a memory, and the memory may store the computer program, and the microprocessor may operate according to the computer program described above.

In addition, the program or the digital signal may be executed by another independent computer system by recording and transferring the program or the digital signal on the recording medium, or transferring the program or the digital signal via the network.

Furthermore, the embodiments and variations above may be combined with each other.

The embodiments described above should be considered to be not limitative but illustrative in all respects. It is intended that the scope of the present invention is represented not by the description above but by the claims, and all the variations and modifications are possible within the meaning and scope equivalent to the claims of the present invention.

[Industrial Applicability]

The present invention is applicable to coordinate determination apparatuses and so on, and is particularly applicable to a coordinate determination apparatus and so on which determine a coordinate position of a pointer on a display unit included in a display apparatus, based on input information obtained from a coordinate input device.

REFERENCE SIGNS LIST

32 Display
34 Computer
36 Keyboard
38 Mouse
40 CD-ROM apparatus
44 CPU
46 ROM
48 RAM
50 Hard disk
52 Communication modem
54 Bus
90 Coordinate input system
100 Display apparatus
110 Pointer
130 Absolute coordinate mode
132 Relative coordinate mode
200 Coordinate determination apparatus
201 Coordinate input device
204 Obtain and store unit
210 Input detection unit
212 Grip detection sensor
220 Transmission unit
230 Display unit
314 Detection result series storage unit
316 Grip estimation unit
318 Operation recognition unit
320 Time correlation specifying unit
324 Coordinate correlation specifying unit
326 Coordinate mode selection unit
328 Coordinate transform unit
510 $G\_it(x, y)$
512 $G\_n(x, y)$
520 $G\_cur(x, y)$
610 Trajectory A
620 Trajectory display A
630 Trajectory B
632 Trajectory C
634 Trajectory D
640 Trajectory display B
642 Trajectory display C
644 Trajectory display D
710 Distance $D_{gd}$
720 Distance $D_{gp}$
730 Distance $D_{pd}$
740 Distance $D_{gg}$
800 Current finger position 810 First input state
812 Second input state
814 Third input state
816 Fourth input state
904, 910 Contact start point
906 Move end point
912 Move point
924 Icon
928 Icon center
944 Display contact start point
946 Display move end point
950 Contact start assumed point
952 Assumed pointer position

The invention claimed is:

1. A coordinate determination apparatus which determines output coordinates corresponding to input coordinates, said coordinate determination apparatus comprising:
   an obtain and store unit configured to serially obtain coordinate information indicating the input coordinates and a time of input of the input coordinates, and store the coordinate information onto a recording medium;
   a time correlation specifying unit configured to specify, as a time correlation value, a correlation between a time of input indicated by first coordinate information and a time of input indicated by second coordinate information, the first and the second coordinate information being among pieces of coordinate information stored on the recording medium;
   a coordinate correlation specifying unit configured to specify, as a coordinate correlation value, a correlation between a set of input coordinates indicated by the second coordinate information and a set of input coordinates indicated by third coordinate information, the second and the third coordinate information being among the pieces of coordinate information;
   a coordinate mode selection unit configured to select, as a coordinate mode, one of a first coordinate mode and a second coordinate mode, based on the coordinate correlation value and the time correlation value; and
   a coordinate transform unit configured to transform the set of input coordinates indicated by the second coordinate information into a set of coordinates according to the coordinate mode selected by said coordinate mode selection unit, so as to determine the set of coordinates as the output coordinates,
   wherein said coordinate transform unit is configured to (i) transform the set of input coordinates indicated by the second coordinate information into a set of coordinates previously associated with the set of input coordinates, when the first coordinate mode is selected, and (ii) transform the set of input coordinates indicated by the second coordinate information into a set of coordinates corresponding to output coordinates already determined for another set of input coordinates, when the second coordinate mode is selected.

2. The coordinate determination apparatus according to claim 1,
   wherein said coordinate correlation specifying unit is configured to specify a distance between the sets of input coordinates as the coordinate correlation value and determine whether or not the specified coordinate correlation value is less than a specific threshold that is predetermined,
   said time correlation specifying unit is configured to specify a difference between the times of input as the time correlation value and determine whether or not the specified time correlation value is less than a predetermined length of specific time, and
   said coordinate mode selection unit is configured to select the second coordinate mode as the coordinate mode, in the case where said coordinate correlation specifying unit determines that the coordinate correlation value is less than the specific threshold and where said time correlation specifying unit determines that the time correlation value is less than the specific time.

3. The coordinate determination apparatus according to claim 2,
   wherein said obtain and store unit is configured to obtain the coordinate information from a coordinate input device including an input detection unit,
   the first coordinate information is coordinate information corresponding to a time at which a user releases a finger from said input detection unit, and
   the second coordinate information is coordinate information corresponding to a time at which the user touches said input detection unit with a finger again after the first coordinate information is detected.

4. The coordinate determination apparatus according to claim 2,
   wherein the third coordinate information is coordinate information corresponding to the time at which a user touches said input detection unit with a finger,
   the first coordinate information is coordinate information corresponding to a time at which the user releases the finger from said input detection unit after the third coordinate information is detected, and
   the second coordinate information is coordinate information corresponding to a time at which the user touches said input detection unit with a finger again after the first coordinate information is detected.

5. The coordinate determination apparatus according to claim 4,
   wherein said obtain and store unit is further configured to obtain, and store onto the recording medium, selection completion information including a selection completion time that is a time at which the user completes a selection operation, and
   said coordinate mode selection unit is configured to obtain the selection completion information from the recording medium, and prevent selecting or changing the coordinate mode when the time of input indicated by the first coordinate information is within a predetermined length of specific permissible time from the selection completion time.

6. The coordinate determination apparatus according to claim 5, further comprising
   a coordinate input device,
   wherein said coordinate input device is configured to receive operations performed by the user for the coordinate input and the selection, and transmit the coordinate information and the selection completion information to said obtain and store unit,
   said input detection unit is a clickable touchpad capable of detecting a press operation which is a mechanical operation, and
   said input detection unit is configured to specify, as the selection completion time, a time at which the user completes an operation of returning the clickable touchpad, the operation being associated with releasing the finger pressing the clickable touchpad.

7. The coordinate determination apparatus according to claim 5, wherein said coordinate mode selection unit is configured to calculate a degree of operation which indicates an operational feature of the user, based on at least one of pieces of coordinate information and selection information that have been obtained by said obtain and store unit prior to the second coordinate information, and change at least one of the specific time, the specific threshold, and the specific permissible time, based on the calculated degree of operation.

8. The coordinate determination apparatus according to claim 7,
wherein said coordinate mode selection unit is configured to calculate, for each piece of coordinate information among the pieces of coordinate information, a difference between a time of input indicated by the piece of coordinate information and a time of input indicated by another piece of coordinate information, and calculate, as the degree of operation, a reciprocal of an average of differences each being the calculated difference.

9. The coordinate determination apparatus according to claim 7,
wherein said coordinate mode selection unit is configured to change a value of at least one of the specific time, the specific threshold, and the specific permissible time to a smaller value when the calculated degree of operation is higher.

10. The coordinate determination apparatus according to claim 1,
wherein a position indicated by the third coordinate information coincides with a position indicated by the first coordinate information.

11. The coordinate determination apparatus according to claim 1,
wherein the first coordinate information is included in a first coordinate series which is a series of coordinate information that is input during a time between when the user once touches said input detection unit with a finger and when the user releases the finger,
the second coordinate information is included in a second coordinate series which is a series of coordinate information that is input during a time between when the user touches said input detection unit with a finger again and when the user releases the finger, and
the third coordinate information is included in the first coordinate series.

12. The coordinate determination apparatus according to claim 2,
wherein said coordinate mode selection unit is configured to cause a display unit to display a specific image, in the case where the predetermined length of specific time has not elapsed since the time of input indicated by the first coordinate information and where said obtain and store unit has not obtained the second coordinate information.

13. The coordinate determination apparatus according to claim 11, further comprising
an operation recognition unit configured to determine whether or not the first coordinate series indicates a gesture that instructs a display apparatus to start specific calculation processing,
wherein said coordinate mode selection unit is configured to prevent selecting the coordinate mode when said operation recognition unit determines that the first coordinate series indicates the gesture.

14. The coordinate determination apparatus according to claim 3,
wherein said obtain and store unit is configured to obtain, and store onto the recording medium, grip information that is information indicating a position at which the user grips said coordinate input device,
said coordinate determination apparatus further comprises a grip estimation unit configured to estimate a grip state that indicates a state in which the user grips said coordinate input device, using the grip information obtained from the recording medium, and
said coordinate mode selection unit is configured to change a value of one of the specific threshold, the specific time, and the specific permissible time, according to the grip state estimated by said grip estimation unit.

15. The coordinate determination apparatus according to claim 1,
wherein said coordinate input device includes at least two input detection units each being said input detection unit, and
said obtain and store unit is configured to store, onto the recording medium, coordinate information obtained from a first input detection unit and coordinate information obtained from a second input detection unit, the first and the second input detection units being among said at least two input detection units.

16. A coordinate determination method for determining output coordinates corresponding to input coordinates, said coordinate determination method comprising:
serially obtaining coordinate information indicating the input coordinates and a time of input of the input coordinates, and storing the coordinate information onto a recording medium;
specifying, as a time correlation value, a correlation between a time of input indicated by first coordinate information and a time of input indicated by second coordinate information, the first and the second coordinate information being among pieces of coordinate information stored on the recording medium;
specifying, as a coordinate correlation value, a correlation between a set of input coordinates indicated by the second coordinate information and a set of input coordinates indicated by third coordinate information, the second and the third coordinate information being among the pieces of coordinate information;
selecting, as a coordinate mode, one of a first coordinate mode and a second coordinate mode, based on the coordinate correlation value and the time correlation value; and
transforming the set of input coordinates indicated by the second coordinate information into a set of coordinates according to the coordinate mode selected in said selecting, so as to determine the set of coordinates as the output coordinates,
wherein said transforming includes: (i) transforming the set of input coordinates indicated by the second coordinate information into a set of coordinates previously associated with the set of input coordinates, when the first coordinate mode is selected; and (ii) transforming the set of input coordinates indicated by the second coordinate information into a set of coordinates corresponding to output coordinates already determined for another set of input coordinates, when the second coordinate mode is selected.

17. A non-transitory computer-readable recording medium on which program is recorded, the program causing a computer to execute the coordinate determination method according to claim 16.

18. An integrated circuit which determines output coordinates corresponding to input coordinates, said integrated circuit comprising:

an obtain and store unit configured to serially obtain coordinate information indicating the input coordinates and a time of input of the input coordinates, and store the coordinate information onto a recording medium;

a time correlation specifying unit configured to specify, as a time correlation value, a correlation between a time of input indicated by first coordinate information and a time of input indicated by second coordinate information, the first and the second information being among pieces of coordinate information stored on the recording medium;

a coordinate correlation specifying unit configured to specify, as a coordinate correlation value, a correlation between a set of input coordinates indicated by the second coordinate information and a set of input coordinates indicated by third coordinate information, the second and the third coordinate information being among the pieces of coordinate information;

a coordinate mode selection unit configured to select, as a coordinate mode, one of a first coordinate mode and a second coordinate mode, based on the coordinate correlation value and the time correlation value; and a coordinate transform unit configured to transform the set of input coordinates indicated by the second coordinate information into a set of coordinates according to the coordinate mode selected by said coordinate mode selection unit, so as to determine the set of coordinates as the output coordinates, wherein said coordinate transform unit is configured to (i) transform the set of input coordinates indicated by the second coordinate information into a set of coordinates previously associated with the set of input coordinates, when the first coordinate mode is selected, and (ii) transform the set of input coordinates indicated by the second coordinate information into a set of coordinates corresponding to output coordinates already determined for another set of input coordinates, when the second coordinate mode is selected.

* * * * *